(12) United States Patent
Arita et al.

(10) Patent No.: US 10,237,211 B2
(45) Date of Patent: Mar. 19, 2019

(54) INFORMATION PROCESSING APPARATUS, INFORMATION TERMINAL, INFORMATION COMMUNICATION RELAY APPARATUS, AND INFORMATION PROCESSING METHOD

(71) Applicant: MITSUBISHI ELECTRIC CORPORATION, Tokyo (JP)

(72) Inventors: Hidekazu Arita, Tokyo (JP); Mitsuo Shimotani, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 459 days.

(21) Appl. No.: 14/916,139

(22) PCT Filed: Oct. 30, 2013

(86) PCT No.: PCT/JP2013/079382
§ 371 (c)(1),
(2) Date: Mar. 2, 2016

(87) PCT Pub. No.: WO2015/063879
PCT Pub. Date: May 7, 2015

(65) Prior Publication Data
US 2016/0218999 A1    Jul. 28, 2016

(51) Int. Cl.
*H04L 12/58* (2006.01)
*G10L 13/00* (2006.01)
(Continued)

(52) U.S. Cl.
CPC .............. *H04L 51/04* (2013.01); *B60R 1/00* (2013.01); *G01C 21/3664* (2013.01);
(Continued)

(58) Field of Classification Search
CPC ........... H04L 51/04; H04L 67/12; B60R 1/00; B60R 2300/80; G01C 21/3664; G01C 21/3691; G01C 21/3697; G10L 13/00
See application file for complete search history.

(56) References Cited

U.S. PATENT DOCUMENTS 8,185,374 B2    5/2012  Kong et al.
2006/0080079 A1  4/2006  Yamabana
(Continued)

FOREIGN PATENT DOCUMENTS

CN    100517302 C    7/2009
CN    103369163 A   10/2013
(Continued)

*Primary Examiner* — Wing F Chan
*Assistant Examiner* — Billy H Ng
(74) *Attorney, Agent, or Firm* — Birch, Stewart, Kolasch & Birch, LLP

(57) ABSTRACT

An information processing apparatus includes a conversion object acquirer and a message converter. The conversion object acquirer acquires a message in a car, which is transmitted and received in the car between an information terminal for driver seat and any other information terminal, as a conversion object message, during a period from the time when the message is generated by a transmitting-end terminal to the time when the message is provided to a user by a receiving-end terminal. The message converter determines the type of a message conversion process on the basis of terminal attribute information of the receiving-end terminal and converts the conversion object message in accordance with the message conversion process which is determined, to thereby acquire a converted message.

15 Claims, 17 Drawing Sheets

(51) Int. Cl.
  *G01C 21/36* (2006.01)
  *B60R 1/00* (2006.01)
  *H04L 29/08* (2006.01)
(52) U.S. Cl.
  CPC ..... *G01C 21/3691* (2013.01); *G01C 21/3697* (2013.01); *G10L 13/00* (2013.01); *H04L 67/12* (2013.01); *B60R 2300/80* (2013.01)

(56) References Cited

U.S. PATENT DOCUMENTS

| | | | |
|---|---|---|---|
| 2006/0095249 A1 | 5/2006 | Kong et al. | |
| 2008/0120419 A1* | 5/2008 | Yamartino | H04L 63/08 709/229 |
| 2009/0271486 A1* | 10/2009 | Ligh | G06F 3/04886 709/206 |
| 2012/0229302 A1* | 9/2012 | Sri-Jayantha | G08G 1/0112 340/905 |
| 2013/0104089 A1 | 4/2013 | Rieffel et al. | |
| 2013/0261888 A1 | 10/2013 | Nagai et al. | |
| 2014/0015971 A1* | 1/2014 | DeJuliis | H04N 7/181 348/148 |
| 2014/0242955 A1* | 8/2014 | Kang | G06F 17/289 455/414.1 |
| 2014/0329563 A1* | 11/2014 | Jang | H04W 4/04 455/563 |
| 2015/0356870 A1* | 12/2015 | Sakata | H04W 4/046 701/301 |

FOREIGN PATENT DOCUMENTS

| | | |
|---|---|---|
| JP | 11-234208 A | 8/1999 |
| JP | 2006-99296 A | 4/2006 |
| JP | 2006-512647 A | 4/2006 |
| JP | 2006-246297 A | 9/2006 |
| JP | 2010-93515 A | 4/2010 |
| JP | 2011-101118 A | 5/2011 |
| JP | 2013-53942 A | 3/2013 |
| JP | 2013-89238 A | 5/2013 |
| WO | WO 2004/059522 A1 | 7/2004 |

* cited by examiner

F I G . 5
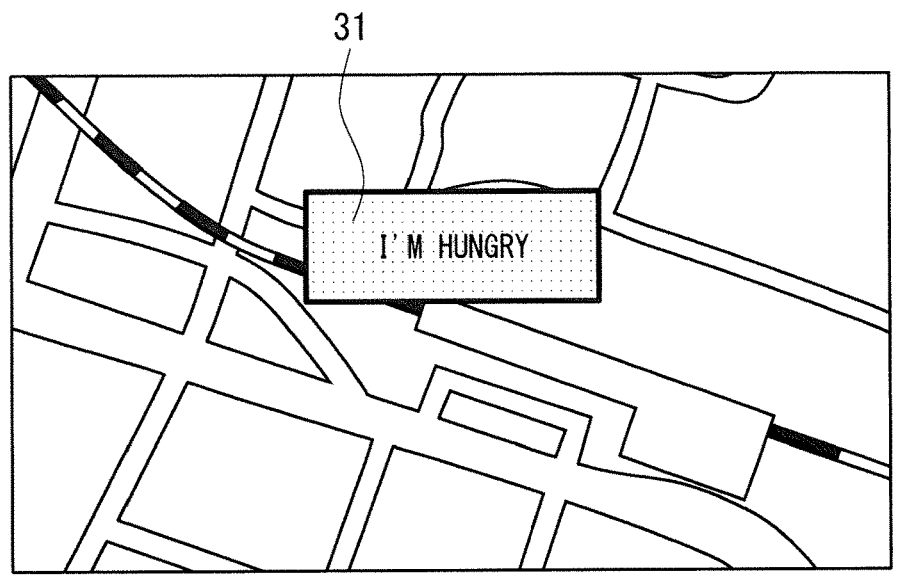
F I G . 6
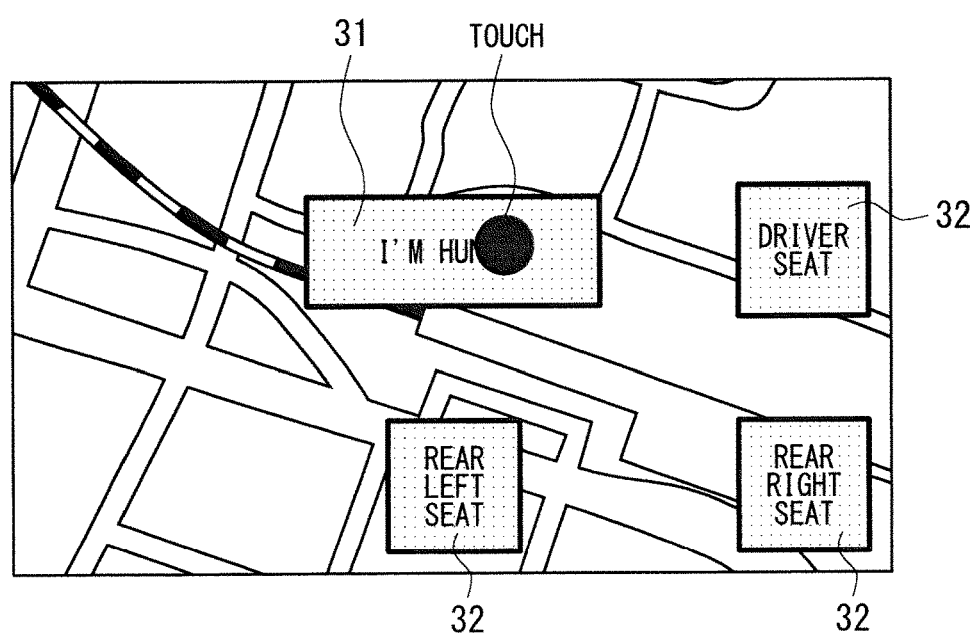

| OPERATION BY TRANSMITTING-END TERMINAL | ATTRIBUTE OF DESTINATION TERMINAL ||
| --- | --- | --- |
| | NOT DRIVER'S TERMINAL | DRIVER'S TERMINAL |
| DRAG | ○ | ○ |
| FLICK | ○ | × |

| OPERATION BY DRIVER'S TERMINAL | VEHICLE SPEED ||
| --- | --- | --- |
| | LOWER THAN GESTURE RELATED THRESHOLD VALUE | NOT LOWER THAN GESTURE RELATED THRESHOLD VALUE |
| DRAG | ○ | × |
| FLICK | ○ | ○ |

F I G . 1 4
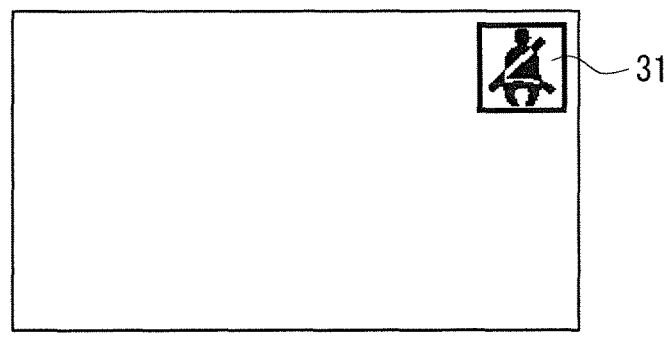
F I G . 1 5
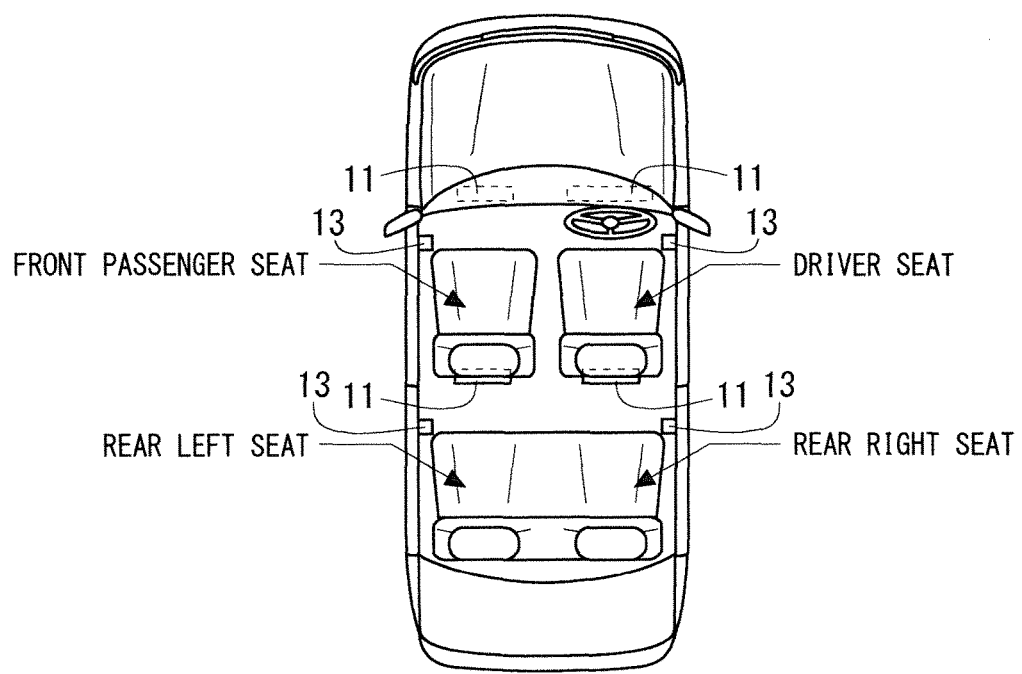

F I G . 1 8
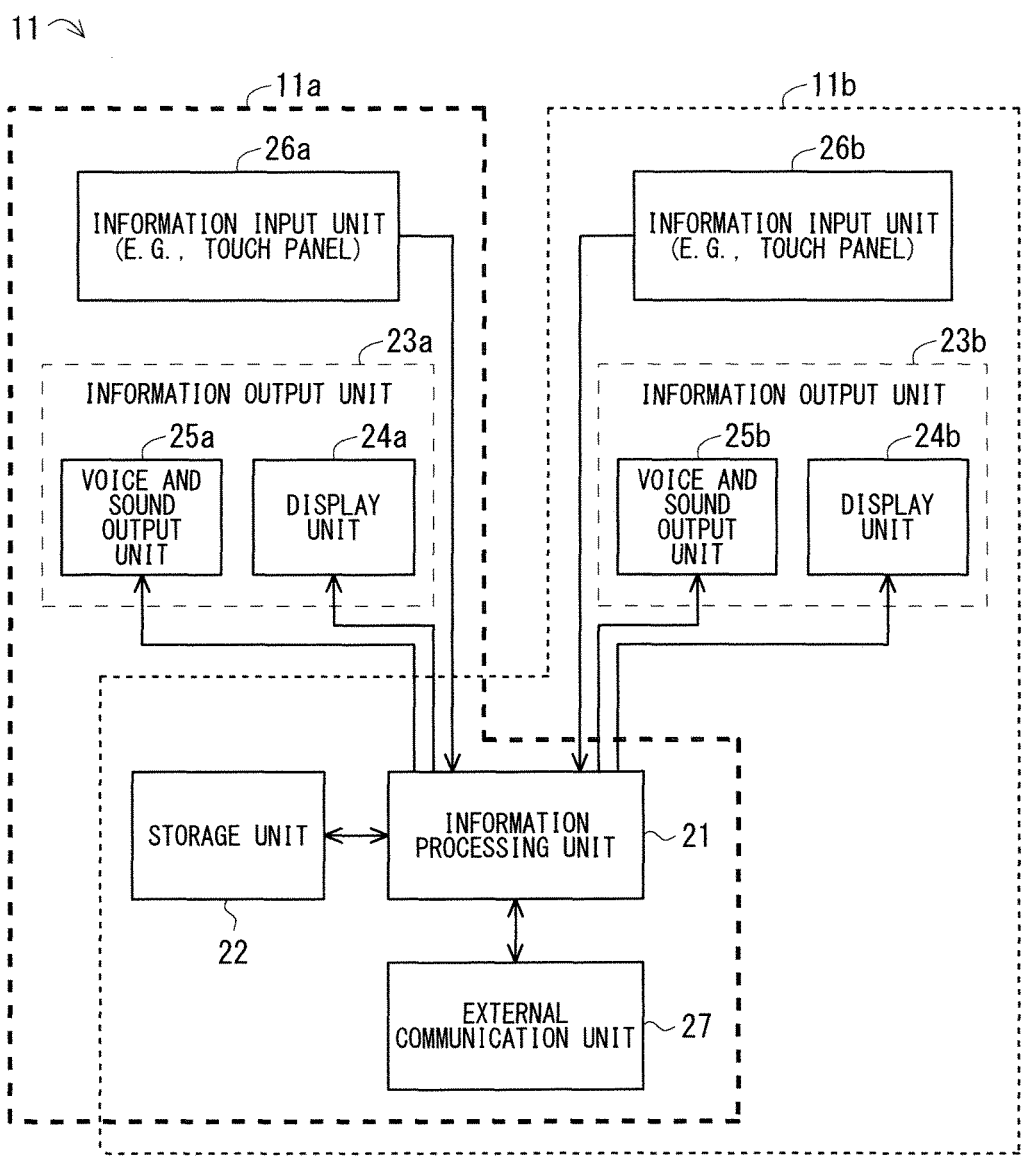

FIG. 29

| ATTRIBUTE OF RECEIVING-END TERMINAL | |
|---|---|
| DRIVER'S TERMINAL | NOT DRIVER'S TERMINAL |
| VOICE CONVERSION | PREDETERMINED CONVERSION OR NO CONVERSION |

FIG. 30

| VEHICLE SPEED | |
|---|---|
| LOWER THAN CONVERSION RELATED THRESHOLD VALUE | NOT LOWER THAN CONVERSION RELATED THRESHOLD VALUE |
| PREDETERMINED CONVERSION OR NO CONVERSION | VOICE CONVERSION |

INFORMATION PROCESSING APPARATUS, INFORMATION TERMINAL, INFORMATION COMMUNICATION RELAY APPARATUS, AND INFORMATION PROCESSING METHOD

TECHNICAL FIELD

The present invention relates to an information processing apparatus, an information terminal, an information communication relay apparatus, and an information processing method.

BACKGROUND ART

In some cases, recently, a plurality of display apparatuses are mounted on a car. The display apparatuses are arranged, for example, in front of a driver seat, between the driver seat and a front passenger seat, and in front of the front passenger seat. Further, a display apparatus for a rear seat is sometimes arranged on a head rest of the front seat.

Patent Document 1 discloses a technique to watch and listen an AV (Audio-Visual) content in a mobile device by any one of a plurality of monitors in a car. Specifically, when a user of the mobile device selects one of the plurality of monitors in the car, an in-vehicle system for controlling the plurality of monitors receives content data from the mobile device and displays the content on a selected monitor. In order to select one of the monitors, the locations of the plurality of monitors in the car are displayed on a screen of the mobile device. Patent Document 1 further discloses another technique to detect the locations of the plurality of monitors in the car.

PRIOR-ART DOCUMENTS

Patent Documents

[Patent Document 1] Japanese Patent Application Laid Open Gazette No. 2010-93515

SUMMARY OF INVENTION

Problems to be Solved by the Invention

Actually, in a moving object such as a car or the like, it is hard to make a communication between people in some cases. Those who enjoy the AV contents may be unaware when someone else is speaking to them. Further, it is preferable to avoid, for example, speaking to a driver or averting driver's eyes significantly.

Furthermore, in a moving object such as a large-sized car, a microbus, a train, an airplane, a ship, or the like, for example, it is hard for people located away from one another to make conversation. Even for those who are located near to one another, voices of other persons or the like sometimes disturb them.

Factors disturbing the communication are not limited to the above-described cases. Further, communications are not always made in a moving object.

It is an object of the present invention to provide a useful technique for people's communication, for example, a technique for providing various forms of people's communication.

Means for Solving the Problems

According to an aspect of the present invention, an information processing apparatus includes a conversion object acquirer and a message converter. The conversion object acquirer acquires a message in a car, which is transmitted and received in the car between an information terminal for driver seat and any other information terminal, as a conversion object message, during a period from the time when the message is generated by a transmitting-end terminal to the time when the message is provided to a user by a receiving-end terminal. The message converter determines the type of a message conversion process on the basis of terminal attribute information of the receiving-end terminal and converts the conversion object message in accordance with the message conversion process which is determined, to thereby acquire a converted message.

Effects of the Invention

According to the above aspect of the present invention, the conversion object message is converted in accordance with the message conversion process during a period from the time when the message is generated on the transmitting end to the time when the message is provided to a user on the receiving end. Therefore, it is possible to provide various forms of people's communication.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a view showing a manner in which a message is generated in a transmitting-end terminal in accordance with the first preferred embodiment;

FIG. 6 is a view showing a manner in which destination candidate icons are displayed on a screen of the transmitting-end terminal in accordance with the first preferred embodiment;

FIG. 14 is a view showing a third example of message to be transmitted in accordance with the fourth preferred embodiment;

FIG. 15 is a view showing a first example of technique to specify a location of a portable information terminal in accordance with a fifth preferred embodiment;

FIG. 18 is a block diagram showing a second example of constitution of the information terminal in accordance with a seventh preferred embodiment;

FIG. 29 is a view showing an exemplary case where whether to perform the message conversion process and the type of the message conversion process are selected in accordance with terminal attribute information in the ninth preferred embodiment; and FIG. 30 is a view showing an exemplary case where whether to perform the message conversion process and the type of the message conversion process are selected in accordance with a vehicle speed in the ninth preferred embodiment.

DESCRIPTION OF EMBODIMENT(S)

The First Preferred Embodiment

<Information Communication System>

Figure 1:
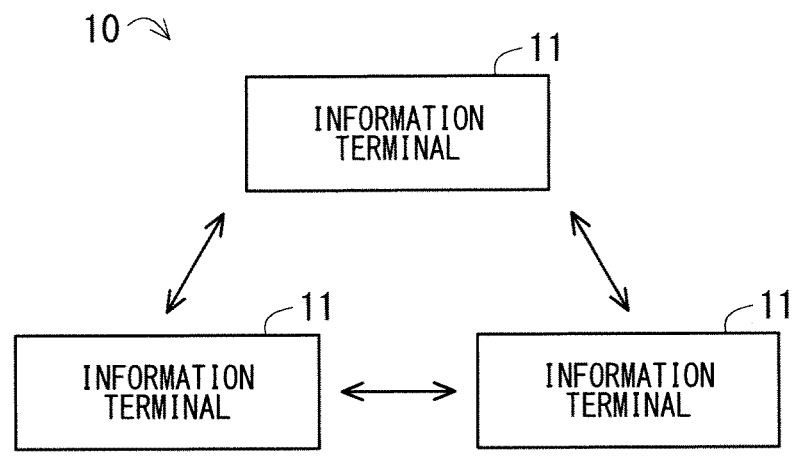
FIG. 1 is a block diagram showing a first example of constitution of an information communication system in accordance with a first preferred embodiment.

FIG. 1 is a block diagram showing a first example of constitution of an information communication system 10 in accordance with the first preferred embodiment. As shown in FIG. 1, the information communication system 10 includes a plurality of information terminal apparatuses 11. The number of information terminal apparatuses 11, however, is not limited to the number shown in FIG. 1. Further, the information terminal apparatus 11 is also referred to as an information terminal 11, a terminal 11, or the like.

The information terminal 11 provides a user with visual information and auditory information. The information terminal 11 also receives information input by the user. Further, the information terminal 11 has a communication function and makes a communication with other information terminals 11.

The communication function can be implemented by wireless communication, wired communication, and a combination thereof. Hereinafter, description will be made on a case where all the information terminals 11 each have both a transmitting function and a receiving function. Further, the information communication system 10 may include a transmit-only information terminal 11 or may include a receive-only information terminal 11.

Since the information terminal 11 has both the transmitting function and the receiving function as described above, the information terminal 11 may serve as a transmitting-end information terminal 11 or may serve as a receiving-end information terminal 11. Further, the information communication system 10 adopts both a one-to-one communication and a one-to-many communication. The information communication system 10, however, may adopt either one communication form.

The information terminal 11 serving as a transmitting end may be referred to as a transmitting-end information terminal 11, a transmitting-end terminal 11, a first information terminal 11, a first terminal 11, or the like. Similarly, the information terminal 11 serving as a receiving end may be referred to as a receiving-end information terminal 11, a receiving-end terminal 11, a destination terminal 11, a second information terminal 11, a second terminal 11, or the like.

Figure 2:
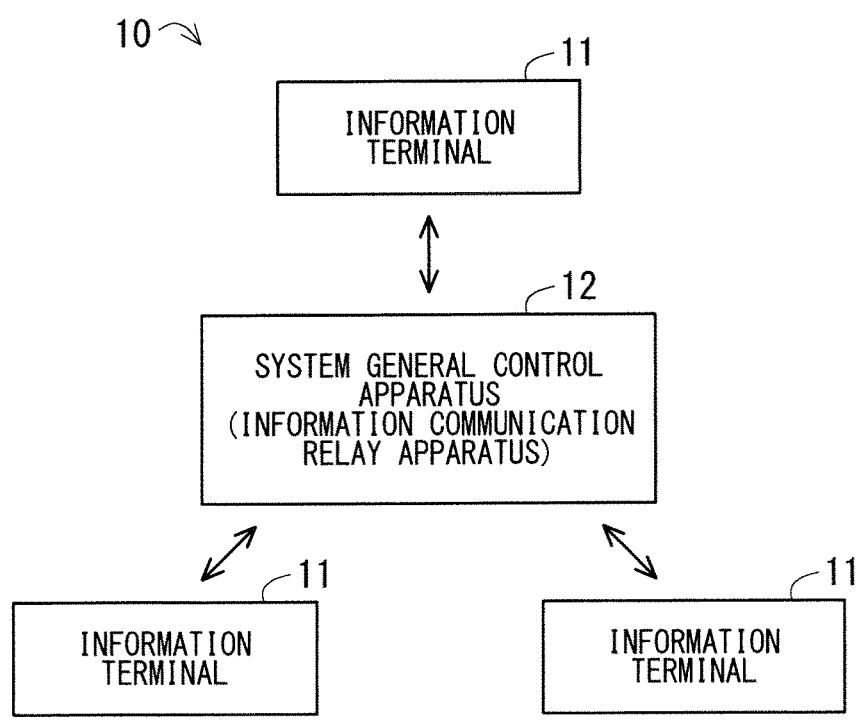
FIG. 2 is a block diagram showing a second example of constitution of the information communication system in accordance with the first preferred embodiment.

FIG. 2 is a block diagram showing a second example of constitution of the information communication system 10. In the exemplary case of FIG. 2, a system general control apparatus 12 for generally controlling the information communication system 10 is added. The system general control apparatus 12 has a communication function and make a communication with each of the information terminals 11. The communication function can be implemented by wireless communication, wired communication, and a combination thereof.

Then system general control apparatus 12 serves as, for example, an information communication relay apparatus which relays communications between the information terminals 11. In other words, each of the information terminals 11 makes a communication via the system general control apparatus 12. Such a relay function can be implemented by a general routing function.

To each of the information terminals 11 and the system general control apparatus 12, given is a specific identification information (hereinafter, sometimes referred to as an ID). The ID is used, for example, to specify a source or a destination of the information. Hereinafter, for simple description, the ID is shared for not only communication but also other processings.

<Information Terminal>

Figure 3:
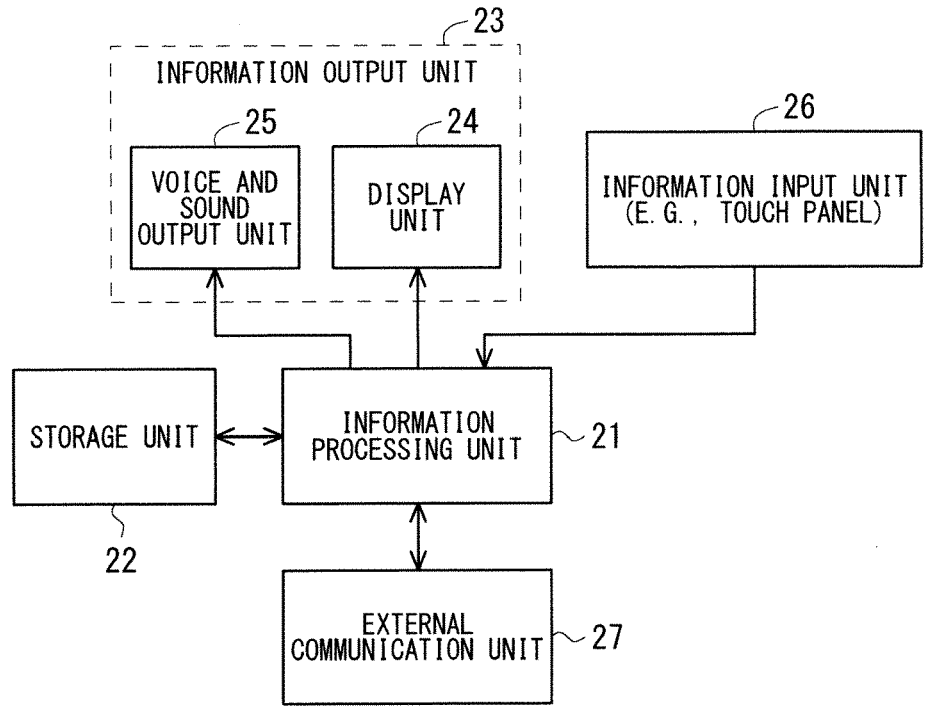
FIG. 3 is a block diagram showing a first example of constitution of an information terminal in accordance with the first preferred embodiment.

FIG. 3 is a block diagram showing an exemplary constitution of the information terminal 11. As shown in the exemplary case of FIG. 3, the information terminal 11 includes an information processing unit 21, a storage unit 22, and an information output unit 23. In this case, the information output unit 23 includes a display unit 24 and a voice and sound output unit 25. The information terminal 11 further includes an information input unit 26 and an external communication unit 27.

The information processing unit 21 is a apparatus for performing various processings in the information terminal 11. For this reason, the information processing unit 21 may be referred to as an information processing apparatus 21. The above-described various processings include, for example, a control of the storage unit 22, the information output unit 23, the information input unit 26, and the external communication unit 27. Further, the above-described various processings include, for example, generation of data to be supplied to the information output unit 23 and analysis of a user operation which is acquired through the information input unit 26.

Herein, description will be made on an exemplary case where the information processing unit 21 is constituted of a central processing unit (formed of e.g., one or a plurality of microprocessor circuits) and a primary storage (formed of e.g., one or a plurality of memory devices such as a ROM, a RAM, a flash memory, and/or the like). In this case, the central processing unit executes various programs stored in the primary storage, to thereby perform various processings. The various processings may be performed in parallel. By performing the various processings, corresponding various functions are implemented.

The program which the central processing unit executes may be stored in the primary storage in advance or may be read out from an auxiliary storage (herein, the storage unit 22) and stored into the primary storage at the execution time. The primary storage is used to store various data as well as the programs. Further, the primary storage provides a work area used when the central processing unit executes the programs. The primary storage provides an image holding unit into which an image to be displayed on the display unit 24 is written. The image holding unit may be referred to as a video memory or a graphic memory.

Though the various functions of the information processing unit 21 are implemented by software in this case, all or some of these functions may be implemented by hardware (for example, an arithmetic circuit for specific computation, or the like).

The storage unit 22 stores therein various information. Herein, the storage unit 22 is provided as an auxiliary storage used by the information processing unit 21. The storage unit 22 may be formed of one or more memory devices such as a hard disk unit, a rewritable and nonvolatile semiconductor memory, an optical disc device, and/or the like.

As the information to be stored in the storage unit 22, there are image data (an object such as an icon or the like, map data, or the like), voice and sound data (operation sound, notification sound, sound effect, guidance voice, or the like), AV data, and the like.

The display unit 24 provides the user with visual information. Herein, description will be made on an exemplary case where the display unit 24 is a liquid crystal display apparatus, and hereinafter, the display unit 24 will be sometimes referred to as a liquid crystal display apparatus 24 or a display apparatus 24. The display unit 24, however, may be another type of display apparatus. The display unit 24 performs a display operation, for example, on the basis of the image data supplied from the information processing unit 21.

The voice and sound output unit 25 provides the user with auditory information. The voice and sound output unit 25 may be implemented by a voice and sound output apparatus including a speaker, an audio amplifier, and the like. For example, the voice and sound data supplied from the information processing unit 21 is converted into an analog electrical signal by the audio amplifier and outputted from the speaker as voice and sound.

The information input unit 26 (hereinafter, sometimes referred to as an input unit 26) receives an input operation given to the information terminal 11 and delivers the input operation to the information processing unit 21 as a signal which is processable by the information processing unit 21.

Herein, description will be made on an exemplary case where the input unit 26 is a contact-type touch panel. For this reason, hereinafter, the input unit 26 will be sometimes referred to as a touch panel 26. A noncontact-type touch panel, however, may be adopted. The touch panel may be referred to as a touch pad. Further, the contact type may be referred to as a two-dimensional (2D) type, and the non-contact type may be referred to as a three-dimensional (3D) type.

Furthermore, description will be made on an exemplary structure in which the touch panel 26 is superimposed on a screen of the liquid crystal display apparatus 24. By using this type, the user can perform an input operation by touching an icon or the like displayed on the screen. A structure in which the touch panel 26 is not superimposed on the screen of the liquid crystal display apparatus 24, however, may be also adopted. In this case, the touch panel 26 is used at a place other than on the screen of the liquid crystal display apparatus 24.

In this exemplary case, as an indicator which gives an input to the touch panel 26, fingers (more specifically, fingertips) of the user are used. As another indicator, however, a tool such as a stylus pen (also referred to as a touch pen) or the like may be used.

Further, instead of or in additional to the touch panel, a pointing device such as a mouse or the like may be used as the input unit 26. Furthermore, a so-called motion capture apparatus which recognizes an action of the user by using various sensors, cameras, or the like.

The external communication unit 27 is a circuit which mediates a communication signal between the information processing unit 21 and an external apparatus which is present outside the terminal. The external apparatus corresponds to another information terminal 11 in the exemplary case of FIG. 1 and corresponds to the system general control apparatus 12 in the exemplary case of FIG. 2.

Specifically, the external communication unit 27 acquires the data to be transmitted, from the information processing unit 21, converts the transmission data into a transmission signal of communication standard adopted in advance, and outputs the transmission signal to the outside of the information terminal 11. Conversely, the external communication unit 27 receives a signal given from the outside of the information terminal 11, extracts data included in the received signal in accordance with the communication standard adopted in advance, and delivers the received data which is obtained thus to the information processing unit 21.

The constitution of the information terminal 11 is not limited to that of FIG. 3. When the auditory information is not outputted, for example, the voice and sound output unit 25 may be omitted. Further, by providing an external input unit, either of or both of the visual information and the auditory information may be captured from the outside of the information terminal 11.

Further, a position information acquisition unit for acquiring information on a current position of the information terminal 11 may be provided. The position information acquisition unit can be formed of, for example, a GPS (Global Positioning System) receiving antenna and a GPS receiving apparatus which detects the current position of the information terminal 11 on the basis of information from the GPS satellite, which is received by the GPS receiving antenna. The constitution of the position information acquisition unit, however, is not limited to this exemplary one.

<Overview of Transmission of Information>

Figure 4:
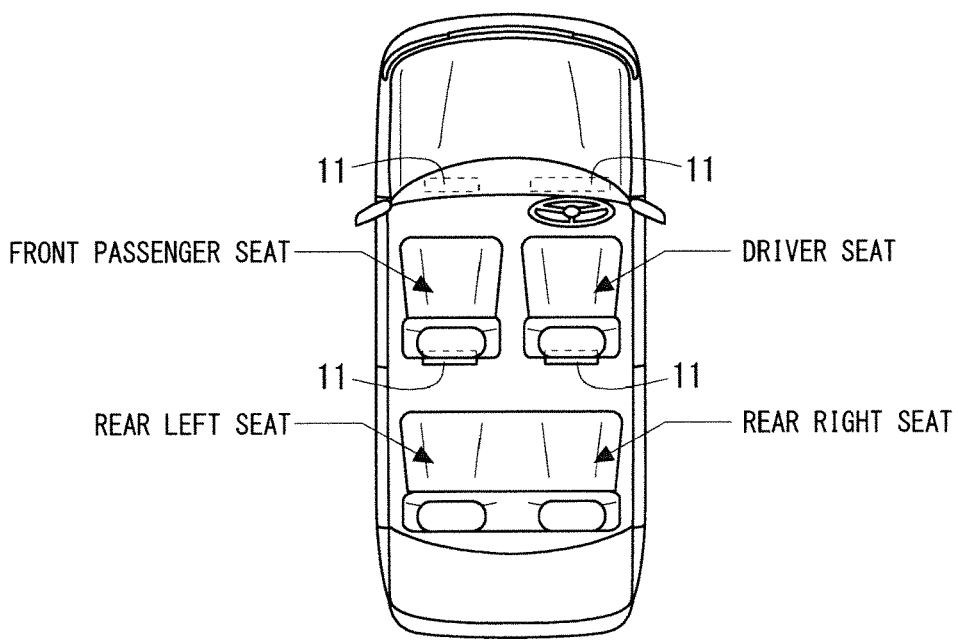
FIG. 4 is a view showing an exemplary case where the information communication system is mounted on a car in accordance with the first preferred embodiment.

Prior to description of more specific exemplary constitution, an overview of information transmission between the information terminals 11 will be described. For more easy understanding of the description, herein, shown is an exemplary case of FIG. 4 where the information communication system 10 is mounted on a car. FIG. 4 is a plan view of a car, and for simple description, a ceiling of the car is not shown.

The information communication system 10, however, may be mounted on a vehicle (e.g., a rail car) other than a car or may be mounted on a moving object (e.g., an airplane, a ship) other than a vehicle. Further, the use of the information communication system 10 is not limited to that in the moving object.

As shown in the exemplary case of FIG. 4, the information terminal 11 is arranged for each seat. Specifically, a display screen of the information terminal 11 for a driver seat (herein, front right seat) is arranged on a part of a dashboard, which is in front of the driver seat, and is realized as, for example, an integrated instrument panel. The integrated instrument panel refers to an indicator panel which can display in an integrated manner, for example, a meter (a speedometer, a tachometer, and/or the like), a warning light, a pilot lamp, a navigation image, operating conditions of various apparatuses (AV (Audio-Visual) equipment and the like), and a captured image obtained by an in-vehicle camera. The integrated instrument panel is sometimes referred to as a meter cluster or the like.

A display screen of the information terminal 11 for a front passenger seat (herein, front left seat) is arranged on a part of the dashboard, which is in front of the front passenger seat. A display screen of the information terminal 11 for a rear right seat is arranged on a back side of the driver seat, for example, a head rest part of the driver seat. A display screen of the information terminal 11 for a rear left seat is arranged on a back side of the front passenger seat, for example, a head rest part of the front passenger seat.

As to the exemplary constitution of FIG. 2, the system general control apparatus 12 can be arranged on any place in the car.

Figure 7:
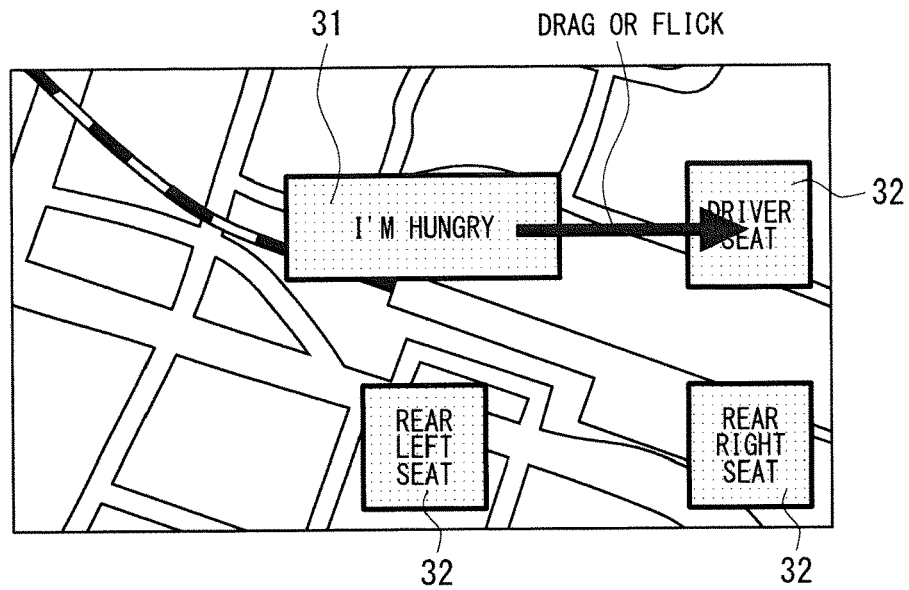
FIG. 7 is a view showing a manner in which the message is dragged to one of the destination candidate icons in accordance with the first preferred embodiment.

FIGS. 5 to 7 are views showing an exemplary information transmitting operation in the information communication system 10. FIGS. 5 to 7 each show an exemplary screen display of the transmitting-end terminal 11.

First, a user of the transmitting-end terminal 11 uses the transmitting-end terminal 11 to generate a message 31 as information to be transmitted (see FIG. 5). In this case, the message 31 is a string of characters (in other words, text data), and an input of the characters is performed by a general-type input operation using a software keyboard or the like.

Though FIGS. 5 to 7 show a case where the message 31 is displayed on a map image, in other words, a background of the message 31 is the map image, a situation in which the message 31 is generated is not limited to this case.

After generation of the message 31, when the user touches the message 31, three icons 32 are displayed on the screen of the transmitting-end terminal 11 (see FIG. 6). In this case, it is assumed that the touch is a one-point touch (i.e., a touch by a finger). In FIG. 6, the manner of touch is conceptually represented by a black circle.

Each of the above icons 32 represents an information terminal 11 which is a destination candidate of the message 31. For this reason, the icon 32 may be referred to as a destination candidate icon 32. FIG. 6 shows an exemplary case where the transmitting-end terminal 11 is the information terminal 11 for the front passenger seat, and the icons 32 corresponding to the respective information terminals 11 for the driver seat, the rear right seat, and the rear left seat are displayed.

Then, when the message 31 is dragged to any one of the destination candidate icons 32 (see FIG. 7), the message is transmitted to the information terminal 11 corresponding to the icon 32. In other words, by the drag operation, specification of the destination terminal 11 and instruction of message transmission can be performed. In this case, it is assumed that the drag is a one-point drag (i.e., a drag by a finger). In FIG. 7, the manner of drag operation is conceptually represented by a black arrow. Further, instead of the drag operation, a flick operation may be used.

In the receiving-end terminal 11, the received message 31 is displayed at a predetermined position in the screen. Further, by performing a gesture operation assigned in advance on the received message 31, the reception of the message 31 may be notified to the transmitting-end terminal 11.

<Message Transmitting Function>

Figure 8:
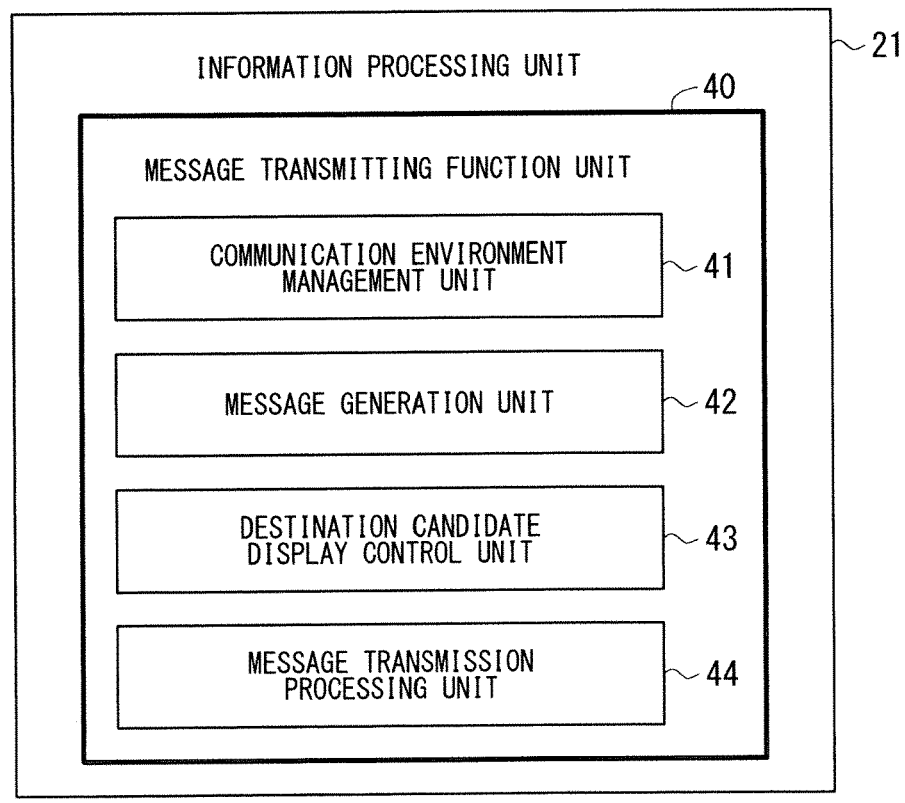
FIG. 8 is a block diagram showing an exemplary constitution of an information processing unit in accordance with the first preferred embodiment.

FIG. 8 is a block diagram showing an exemplary constitution of the information processing unit 21, being related to the transmission of the message 31. As shown in the exemplary constitution of FIG. 8, the information processing unit 21 includes a message transmitting function unit 40, and the message transmitting function unit 40 is constituted of a communication environment management unit 41, a message generation unit 42, a destination candidate display control unit 43, and a message transmission processing unit 44.

<Communication Environment Management Unit>

The communication environment management unit 41 checks the presence of an information terminal 11 which is to be a communication partner of the self-terminal 11, in other words, the presence of the other terminal 11. Checking the presence of the other terminal 11 can be performed by a general technique in the field of communication.

Further, the communication environment management unit 41 acquires terminal layout information on a layout positional relation of the information terminals 11 included in the information communication system 10. The terminal layout information is, for example, information which collects the respective layout positions of the information terminals 11 (discriminable by the IDs). From the terminal layout information, information on a relative positional relation between the self-terminal 11 and the other terminal 11 can be acquired, and the information on the relative positional relation is used to arrange the destination candidate icons 32 (see FIG. 6).

Since the respective layout positions of the four information terminals 11 are fixed in the exemplary case of FIG. 4, the respective layout positions of the information terminals 11 are already known. For this reason, the terminal layout information can be generated in advance, for example, when the information communication system 10 gets mounted on the car. Further, the terminal layout information may be stored in advance into the storage unit (for example, the storage unit 22 or the primary storage of the information processing unit 21) of each information terminal 11. The communication environment management unit 41 can thereby acquire the terminal layout information by performing a process (referred to as a first terminal layout information acquisition process) for acquiring the terminal layout information from the storage unit in which the terminal layout information is stored in advance.

Alternatively, there may be a case where information on the layout position of itself is given to each information terminal 11 in advance and the information on the layout position, being associated with the ID of the information terminal 11, is distributed to the other terminals 11. In other words, each information terminal 11 may collect the ID and the information on the layout position from each of the other terminals 11. The communication environment management unit 41 can thereby acquire the terminal layout information by performing a process (referred to as a second terminal layout information acquisition process) for acquiring the terminal layout information through information collection using communication with the other terminals 11.

Further, both the first terminal layout information acquisition process and the second terminal layout information acquisition process can be adopted.

The communication environment management unit 41 further acquires terminal attribute information of each of the other terminals 11. The terminal attribute information is, for example, information for discrimination, indicating that the information terminal 11 (discriminable by the ID) is one for the driver seat, the front passenger seat, the rear right seat, or the rear left seat. The terminal attribute information in the exemplary case is information indicating whether the information terminal 11 is one for the driver seat (in other words, for driver) or not. Further, the terminal attribute information indicating whether the information terminal 11 is one for the driver or not may be formed using the binary condition (e.g., True or False).

The terminal attribute information is displayed, for example, in the destination candidate icons 32 (see FIG. 6).

In the exemplary case of FIG. 4, it is already known that four information terminals 11 are included in the information communication system 10. For this reason, the respective terminal attribute information of the self-terminal 11 and the other terminals 11 may be each stored in advance in the storage unit (for example, the storage unit 22 or the primary storage of the information processing unit 21) of each of the information terminals 11. The communication environment management unit 41 can thereby acquire the terminal attribute information of the other terminals 11 (further, of the self-terminal 11) by performing a process (referred to as a first terminal attribute information acquisition process) for acquiring the terminal attribute information from the storage unit in which the terminal attribute information is stored in advance.

Alternatively, each information terminal 11 may distribute the terminal attribute information of itself to the other terminals 11. In other words, each information terminal 11 may collect the terminal attribute information from each of the other terminals 11. The communication environment management unit 41 can thereby acquire the terminal attribute information by performing a process (referred to as a second terminal attribute information acquisition process) for acquiring the terminal attribute information through information collection using communication with the other terminals 11.

Further, both the first terminal attribute information acquisition process and the second terminal attribute information acquisition process can be adopted.

The communication environment management unit 41 performs the above-described various processes at a timing set in advance. The timing includes, for example, at least one of the start-up of the information terminal 11, a periodic timing during the operating time, a timing when the other terminal 11 is detected, and a timing immediately before the message 31 is transmitted.

The terminal attribute information may be information on a user of the information terminal 11, for example, a user name, a sex, an age, an age bracket (for example, for discrimination between child and adult), or the like. The information on the user may be registered in advance, for example, in the information terminal 11.

<Message Generation Unit>

The message generation unit 42 provides the user with a generation environment of the message 31. When an operation of touching an icon for generation of the message is performed as the operation to request the generation environment of the message 31, for example, the message generation unit 42 displays an image of software keyboard on the screen of the self-terminal 11 and receives the input of the message 31. Further, the message generation unit 42 displays the message 31 on the screen during and after the generation.

<Destination Candidate Display Control Unit>

The destination candidate display control unit 43 displays the destination candidate icon 32 representing a destination candidate of the message 31 on the screen of the self-terminal 11. Since there are three other terminals 11 in the exemplary case of FIG. 4, three destination candidate icons 32 are displayed as shown in FIG. 6.

The destination candidate icons 32 are displayed by performing a destination candidate call operation for the self-terminal 11. The destination candidate call operation is, for example, an operation of touching the message 31 as described above. Alternatively, for example, an operation of touching a dedicated icon, i.e., a destination candidate call icon may be assigned to the destination candidate call operation.

In order to display the destination candidate icons 32, the destination candidate display control unit 43 arranges the destination candidate icons 32 on the screen of the self-terminal 11 in accordance with the relative positional relation among the self-terminal 11 and the other terminals 11 on the basis of the terminal layout information acquired by the communication environment management unit 41 (see FIG. 6).

More specifically, in the exemplary case of FIG. 6, the self-terminal 11 is the information terminal 11 for the front passenger seat and the display position of the message 31 corresponds to the layout position of the self-terminal 11. Therefore, the destination candidate icon 32 corresponding to the information terminal 11 for the driver seat is arranged on the right side of the message 31. The destination candidate icon 32 corresponding to the information terminal 11 for the rear left seat is arranged below the message 31. Further, the destination candidate icon 32 corresponding to the information terminal 11 for the rear right seat is arranged on the diagonally downward right side of the message 31.

In the exemplary case of FIG. 6, as described above, the display position of the message 31 corresponds to the layout position of the self-terminal 11. The position on the screen to which the position of the self-terminal 11 corresponds is not limited to this exemplary case.

Further, the destination candidate display control unit 43 displays, in each icon 32, the terminal attribute information (discrimination among the seats in the exemplary case of FIG. 6) of the corresponding other terminal 11. The terminal attribute information is acquired by the communication environment management unit 41 as described above.

<Message Transmission Processing Unit>

When a first gesture operation which is determined in advance is performed on the self-terminal 11, the message transmission processing unit 44 performs a process for transmitting the message 31. The first gesture operation is a gesture operation in which a trajectory is drawn from the display position of the message 31 toward one of the destination candidate icons 32. As the gesture operation of drawing a trajectory, as described above, a drag or a flick can be used.

Further, an execution condition required to perform a message transmission process is that the first gesture operation should be performed sequentially to the destination candidate call operation. Herein, performing the user operations sequentially refers to that the following user operation should be started within a predetermined time period from the end of the preceding user operation. The same applies to a case where three or more user operations are performed sequentially.

In this case, the first gesture operation can be started without removing, from the touch panel 26, the indicator which touches the message 31 in the destination candidate call operation. Alternatively, the first gesture operation may be started after the indicator which touches the message 31 in the destination candidate call operation is once removed from the touch panel 26.

The message transmission process includes a destination selection process and a transmission object selection process. The destination selection process is a process of selecting one of the other information terminals 11 which is determined as the destination of the message 31. The transmission object selection process is a process of selecting a transmission object among display objects displayed on the screen of the self-terminal 11.

In the destination selection process of the first preferred embodiment, the information terminal 11 corresponding to the icon 32 positioned in the direction of the trajectory of the first gesture operation is selected as the destination. In the transmission object selection process of the first preferred embodiment, the message 31 which is the display object positioned at the starting point of the trajectory of the first gesture operation is selected as the transmission object.

The message transmission processing unit 44 generates the transmission data in which a header includes the ID of the selected destination terminal 11 and a payload includes the message 31, and delivers the transmission data to the external communication unit 27 (see FIG. 3). The message 31 is thereby transmitted to the destination terminal 11.

<Exemplary Operation>

Figure 9:
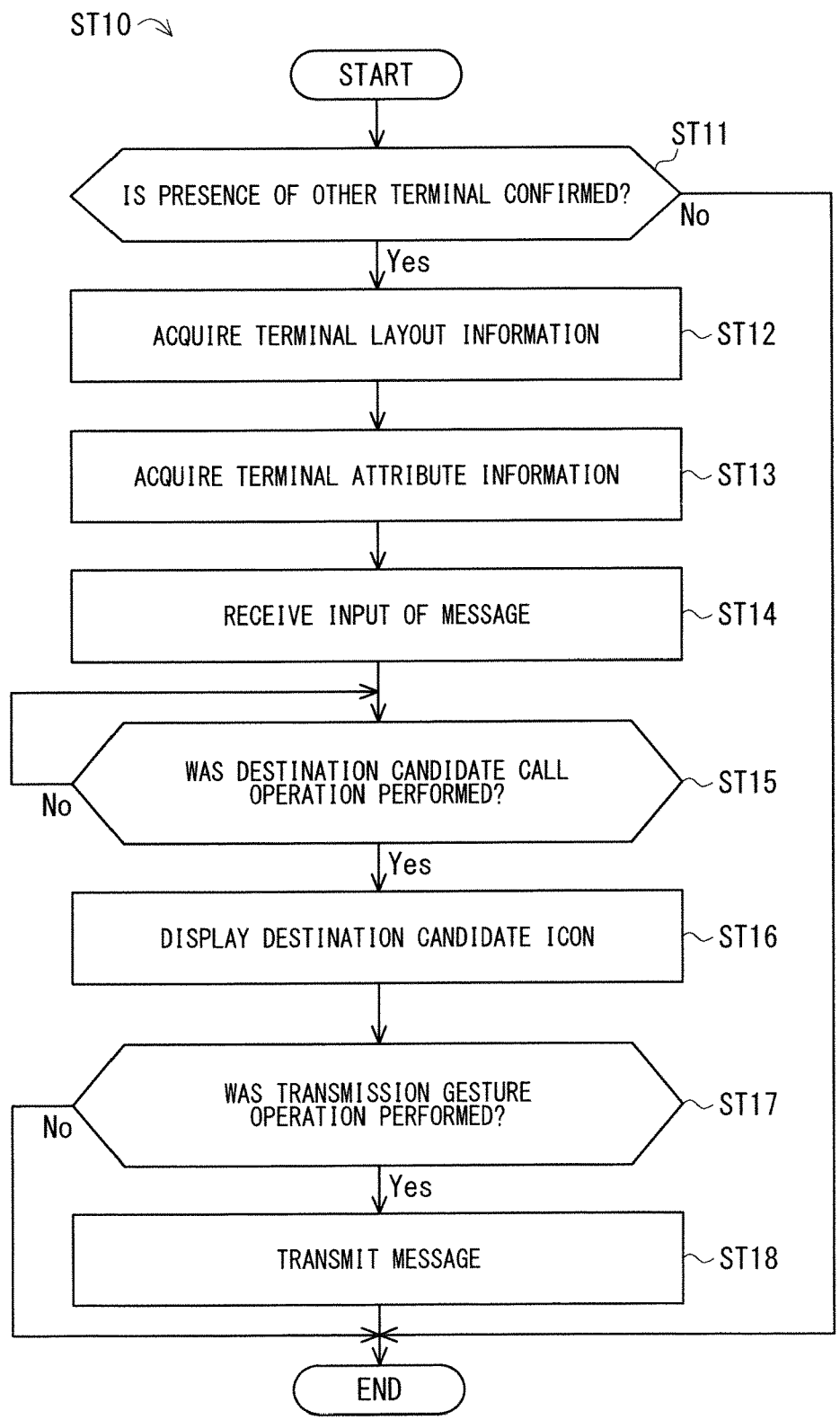
FIG. 9 is a flowchart showing an exemplary operation of a message transmitting function unit in accordance with the first preferred embodiment.

FIG. 9 is a flowchart showing an exemplary operation of the message transmitting function unit 40. As shown in the operation flow ST10 of FIG. 9, the communication environment management unit 41 checks the presence of the other terminal 11 in step ST11. When the presence of the other terminal 11 is not confirmed, the operation flow ST10 is finished.

When the presence of the other terminal 11 is confirmed in step ST11, the communication environment management unit 41 acquires the terminal layout information in step ST12 and acquires the terminal attribute information of the other terminal 11 in step ST13. Step ST13 may be performed prior to step ST12.

After that, in step ST14, the message generation unit 42 receives the input of the message 31.

Then, in step ST15, the process waits for execution of the destination candidate call operation. When an input analysis unit of the information processing apparatus 21 detects the destination candidate call operation, the destination candidate display control unit 43 causes the display apparatus 24 to display the destination candidate icon 32 in step ST16.

Next, in step ST17, the process waits for execution of the first gesture operation. In FIG. 9, however, when the first gesture operation is not detected within the predetermined time period from the end of the destination candidate call operation, the operation flow ST10 is finished.

When the input analysis unit of the information processing apparatus 21 detects that the first gesture operation has been performed sequentially to the destination candidate call operation in step ST17, the message transmission processing unit 44 transmits the message 31 on the basis of the first gesture operation, as described above, in step ST18.

<Effect>

In the first preferred embodiment, by using the gesture operation, it is possible to specify the message 31 to be transmitted and the destination of the message 31. Therefore, the message 31 can be transmitted with an intuitive operation.

Further, In the case where the operation of touching the message 31 is assigned to the destination candidate call operation, it is easier to perform the first gesture operation which commands the transmission of the message sequentially thereto, as compared to the operation of touching a destination candidate call icon displayed at a place separated from the message 31. In other words, it is possible to provide an excellent operability.

Furthermore, by using the destination candidate icon 32, it becomes easier to recognize and specify the destination terminal 11.

Herein, all the destination candidate icons 32 may be arranged at a predetermined place in the screen (for example, on the lower side of the screen). By arranging, however, the destination candidate icons 32 in accordance with the relative positional relation among the self-terminal 11 and the other terminals 11 as shown above, the position of the information terminal 11 to which the message 31 is to be transmitted coincides with the direction of the first gesture operation. It is therefore possible to provide an intuitive operability.

Further, displaying the terminal attribute information (in the above-described case, discrimination among the seats) in the destination candidate icon 32 also contributes to the excellent operability.

The Second Preferred Embodiment

In the first preferred embodiment, the case where the transmitting operation of the message 31 is performed by one finger has been described. In the second preferred embodiment, an exemplary operation performed by two or more fingers will be described.

Figure 10:
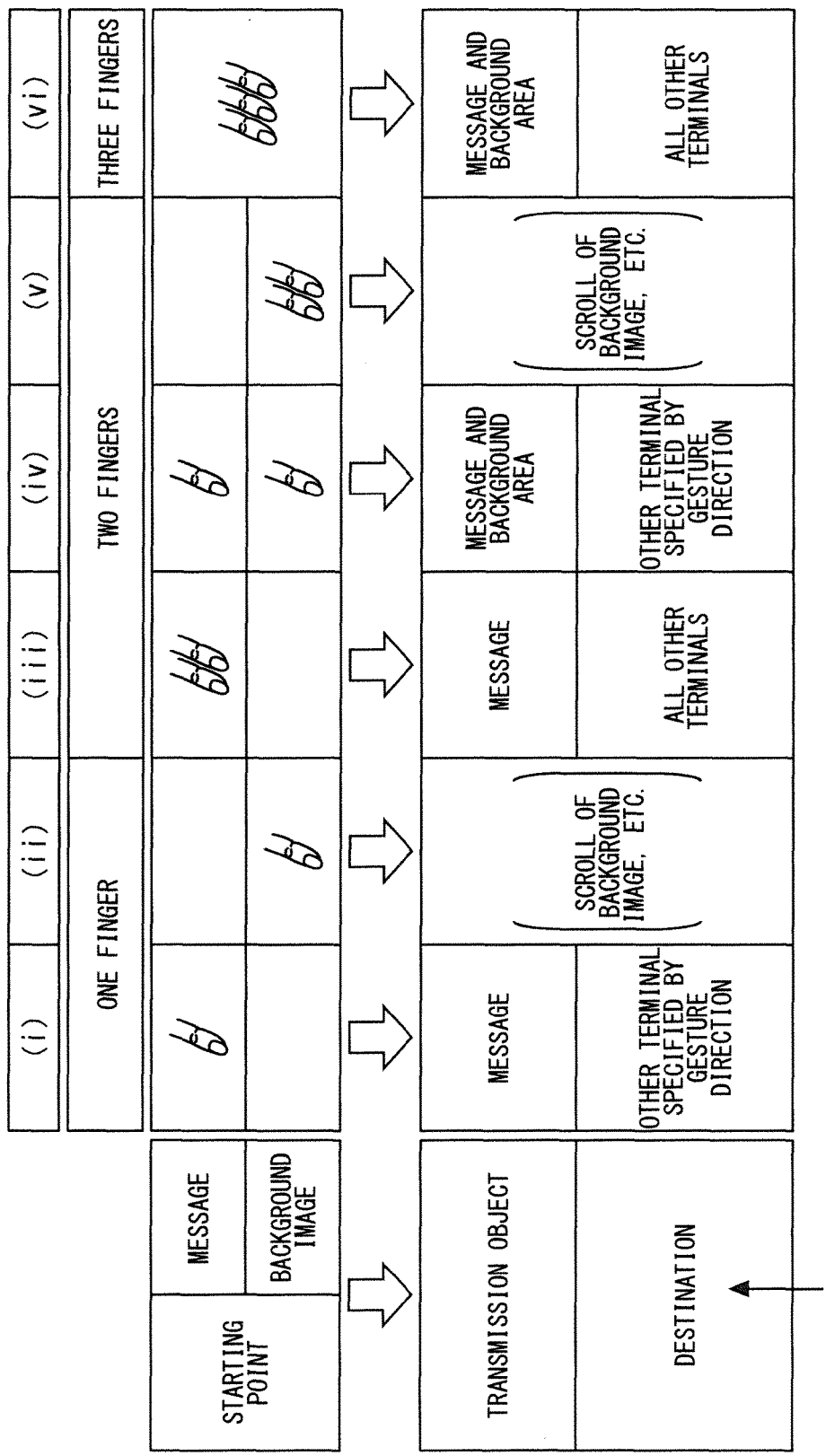
FIG. 10 is a view showing a transmission selection rule in accordance with a second preferred embodiment.

FIG. 10 is a view showing a transmission selection rule. The transmission selection rule specifies how to select the destination terminal 11 in the destination selection process. The transmission selection rule also specifies how to select the transmission object among the display objects displayed on the transmitting-end terminal 11 in the transmission object selection process. The transmission selection rule is determined in advance and given to the information processing unit 21 in a form which is usable to the information processing unit 21 (a look-up table, a conditional expression of a program, or the like).

The transmission selection rule shown in FIG. 10 specifies rules in a case where a second gesture operation in which a plurality of trajectories are drawn in the same direction at the same time is performed on the transmitting-end terminal 11 sequentially to the destination candidate call operation (see rules (iii) to (vi)). In this case, as a gesture operation of drawing a trajectory, a drag and a flick can be used. FIG. 10 also shows the rules on the one-finger operation described in the first preferred embodiment (see rules (i) to (ii)).

Specifically, the transmission selection rule on the second gesture operation determines in advance the relation among the respective types of the display objects positioned at the starting points of the above-described plurality of trajectories, respective directions of the above-described plurality of trajectories, the destination terminal 11, and the transmission object.

The rule (iii) specifies a rule on a case where the second gesture operation draws two trajectories and both the starting points of the two trajectories are positioned on the message 31. In this case, the message 31 is selected as the transmission object. Further, regardless of the directions of the trajectories, all the other terminals 11 are selected as the destination terminals 11.

The rule (iv) specifies a rule on a case where the second gesture operation draws two trajectories and one of the starting points of the two trajectories is positioned on the message 31 and the other starting point is positioned on the display object other than the message 31. Herein, with reference to the exemplary case of FIG. 5, shown is the case where the display object other than the message 31 is a background image of the message (more specifically, a map image). In this case, both the message 31 and the background image are selected as the transmission objects. Further, the information terminals 11 corresponding to the destination candidate icons 32 positioned in the directions of the two trajectories are selected as the destination terminals 11.

In accordance with the rule (v), the process for transmitting the message 31 is not performed. Specifically, the rule (v) specifies a rule on a case where the second gesture operation draws two trajectories and both the starting points of the two trajectories are positioned on the background image, not on the message 31. In this case, a predetermined process, e.g., a scroll of the background image is performed.

The rule (vi) specifies a rule on a case where the second gesture operation draws three trajectories. The rule (vi), however, does not include any condition related to the positions of the starting points of the three trajectories. In accordance with the rule (vi), all the display objects (i.e., the message 31 and the background image) displayed on the transmitting-end terminal 11 are selected as the transmission objects. Further, regardless of the directions of the trajectories, all the other terminals 11 are selected as the destination terminals 11.

Furthermore, the rules (ii) and (v) in which the process for transmitting the message 31 is not performed may be omitted from the transmission selection rule.

With reference to FIG. 10 again, in the rules (i) and (iv), one finger for the gesture operation is placed on the message 31, and the other terminal 11 positioned in the direction of the gesture operation is selected as the destination terminal 11. In contrast to this case, in the rule (iii), two fingers are placed on the message 31 and all the other terminals 11 are selected as the destination terminals 11. For this reason, in consideration of the rules (i), (iii), and (iv), with respect to the first gesture operation using one finger and the second gesture operation using two fingers, the transmission selection rule of FIG. 10 also specifies a rule (referred to as a rule (vii)) that the destination terminal(s) 11 is (are) selected in accordance with the number of starting points of the gesture operation, which are positioned on the message 31.

Further, the case has been described above where the second gesture operation draws a plurality of trajectories at the same time. Instead, it can be also assumed that a plurality of trajectories are drawn in sequence. The rule (iv) of FIG. 10 may be also applied to, for example, a case where the message 31 is flicked and subsequently the background image is flicked. Herein, assuming that the destination terminal 11 is selected in accordance with the direction of the flick of the message 31, the direction of the flick of the background image does not have to be the same as the direction of the flick of the message 31. In consideration of these facts, the following rule (referred to as a rule (viii)) can be determined.

Specifically, the rule (viii) specifies a rule on a case where the gesture operation of drawing a trajectory from the display position of the message 31 toward any one of the destination candidate icons 32 (in other words, the already-described first gesture operation) is performed and subsequently a gesture operation (referred to as a third gesture operation) of drawing a trajectory from the position of the display object other than the message 31 in any direction is performed. Further, it is assumed that the destination candidate call operation, the first gesture operation, and the third gesture operation are performed sequentially in this order. In the rule (viii), the other terminal 11 specified by the first gesture operation is selected as the destination terminal 11, like in the first preferred embodiment. Furthermore, as the transmission objects, selected are the message 31 and the display object which is determined in advance (herein, the background image of the message 31).

Further, the case has been described above where the second gesture operation draws a plurality of trajectories in the same direction. Instead, the plurality of trajectories can be drawn in different directions. There may be cases of, for example, a pinch out and a pinch in. In consideration of this point, a rule may be adopted, for example, in which when the pinch out is performed, the message 31 is transmitted to all the other terminals 11.

Herein, in the rule (iii) and the like, the case has been described above where all the other terminals 11 are selected as the destinations. Instead, for example, in accordance with the terminal attribute information, some of the other terminals 11 may be excluded from the destinations. It thereby becomes possible to select the destination with some conditions that the driver's terminal 11, for example, should be excluded, or the information terminal 11 of a user whose age is not higher than a predetermined age should be excluded. Such conditions may be applied to the case where the destination is specified in accordance with the direction of the gesture, like the rule (i) and the like.

In accordance with the second preferred embodiment, it is possible to provide various operations.

The Third Preferred Embodiment

Figures 11, 12, 13:
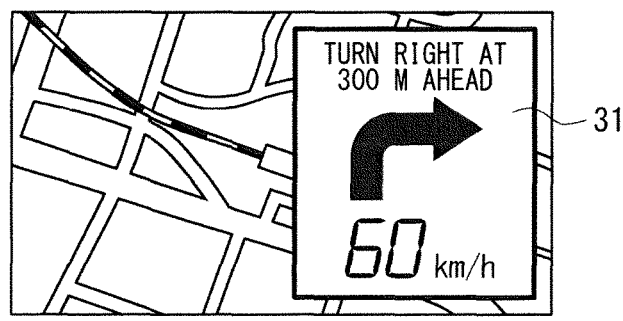
FIG. 11 is a view showing an exemplary association between a gesture operation and a terminal attribute in accordance with a third preferred embodiment.
FIG. 12 is a view showing an exemplary association between the gesture operation and a vehicle speed in accordance with the third preferred embodiment.
FIG. 13 is a view showing a second example of message to be transmitted in accordance with a fourth preferred embodiment.

The gesture operation for commanding the transmission of the message may be associated with the terminal attribute information. FIG. 11 is a view showing an exemplary association between the gesture operation and the terminal attribute information. As shown in the exemplary case of FIG. 11, assignment of the gesture operations for commanding the transmission of the message becomes different depending on whether the destination terminal 11 (i.e., the receiving-end terminal 11) is the driver's terminal or not.

Specifically, when the destination terminal 11 is not the driver's terminal, the drag and the flick are assigned to the above-described first to third gesture operations. In contrast to this, when the destination terminal 11 is the driver's terminal, only the drag is assigned to the above-described first to third gesture operations.

Conversely to the case of FIG. 11, there may be a case where only the flick is assigned to the operation of transmitting the message to the driver's terminal 11. Further, the types of the gesture operations and the assignment thereof are not limited to the case shown in FIG. 11.

In accordance with the case of FIG. 11, when the destination terminal 11 is the driver's terminal, the number of gesture operations which can be received is set less. Therefore, it is thought that the transmitting-end user carefully perform the message transmitting operation in consideration of the types of the gesture operations which can be received. For this reason, it is possible to make the transmitting-end user mindfully consider, for example, whether it is appropriate or not to transmit the message 31 now to the driver who is driving car. Further, even if the gesture operation which cannot be received (in the case of FIG. 11, the flick) is performed, since the message 31 is not received by the driver's terminal 11, the driver does not become distracted by the received message 31.

Herein, the flick is an operation which is less careful than the drag. Conversely, the drag is an operation which is more careful than the flick. This is because it is thought that the user is conscious of the drag operation itself from the start to the end of the operation. In consideration of this, the drag is capable of giving a cue to pay attention to the destination. Therefore, it is more desirable that the drag is assigned to the operation of transmitting the message 31 to the driver, like in the case of FIG. 11.

FIG. 12 is a view showing an exemplary association between the gesture operation and a vehicle speed in the case where the transmitting-end terminal 11 is the driver's one. As shown in the exemplary case of FIG. 12, assignment of the gesture operations for commanding the transmission of the message becomes different in accordance with the speed of the car in which the information communication system 10 is mounted.

Specifically, when the vehicle speed is lower than a predetermined gesture related threshold value (including when the car is stopped), the drag and the flick are assigned to the above-described first to third gesture operations. In contrast to this, when the vehicle speed is not lower than a predetermined gesture related threshold value, only the flick is assigned to the above-described first to third gesture operations. Further, the types of the gesture operations and the assignment thereof are not limited to the case shown in FIG. 12.

As described above, the drag is likely to draw the user's attention to the operation itself. For this reason, it is not preferable that the driver who is driving the car performs the drag operation. In consideration of this, in the case of FIG. 12, when the vehicle speed is not lower than the gesture related threshold value, the gesture operation that the driver is allowed to perform is restricted only to the flick. This provides an operability with consideration for the driver.

The Fourth Preferred Embodiment

In the first preferred embodiment, the case where the message 31 is formed of characters has been described. The message 31, however, may be, for example, an image (in other words, image data). Further, in the first preferred embodiment, the case where the user generates the message 31 has been described. The message 31, however, is not necessarily generated by a person (or persons). In other words, a message generated by any one of various hardwares or softwares can be transmitted.

An image that the user draws by using the touch panel 26 and an image that the user reads out from the storage unit 22, for example, can be each handled as the message 31 to be transmitted.

Further, as shown in FIG. 13, for example, a guidance image which is displayed at the appropriate times in a case where a navigation function is used can be handled as the message 31 to be transmitted. Furthermore, as shown in FIG. 14, a notification image (an image of the warning light, that of the pilot lamp, or the like) which is displayed in relation to the condition of the car can be handled as the message 31 to be transmitted. The notification image is not limited to the exemplary one shown in FIG. 14.

In these cases, a variety of messages 31 can be transmitted.

When the message 31 is not generated by the user like in the cases of FIGS. 13 and 14, the message generation unit 42 (see FIG. 8) for providing the user with the generation environments of the message 31 does not operate. Further, the function in which the user generates the message 31 may be omitted, and in this case, it is not necessary to provide the message generation unit 42.

The Fifth Preferred Embodiment

In the first preferred embodiment, the case where the information terminals 11 are fixed at predetermined positions in the car has been described. A portable-type information terminal (hereinafter, sometimes referred to as a portable terminal) 11, however, may be also applied to the information communication system 10. The portable terminal 11 is a PDA (Personal Digital Assistant) such as a cellular phone, a smartphone, a tablet terminal, or the like. The portable terminal 11 may be also a device for specific use, such as a PND (Portable Navigation Device) or the like.

Hereinafter, it is assumed that the portable terminal 11 communicates with another terminal 11 via wireless communication. By connecting the portable terminal 11 to, for example, the distribution line provided in advance in the car, however, wired communication can be also used.

The layout position of the portable terminal 11 is not settled. For this reason, when the portable terminal 11 serves as the receiving end of the message 31 (in other words, the destination of the message 31), the destination candidate icon 32 corresponding to the portable terminal 11 may be arranged, for example, at a predetermined place in the screen (for example, on the lower side of the screen) of the transmitting-end terminal 11. In this case, by displaying the ID or the terminal attribute information (e.g., the user name) of the portable terminal 11 in the destination candidate icon 32, the transmitting-end user can identify the portable terminal 11.

In this case, by displaying the destination candidate icon 32 in accordance with the relative positional relation among the self-terminal 11 (i.e., the transmitting-end terminal 11) and the other terminals 11, the message 31 can be transmitted with an intuitive operation. For this, it is necessary to register the positional information of the portable terminal 11 into the terminal layout information. The position of the portable terminal 11 can be specified, for example, in the following manner.

As shown in FIG. 15, for example, a terminal detection unit 13 is arranged in advance for each seat, and the terminal detection unit 13 detects the portable terminal 11, to thereby register the information on the portable terminal 11 into the terminal layout information. In other words, since the terminal detection unit 13 is fixed at a predetermined place, the layout information of the terminal detection unit 13 is used as the layout information of the portable terminal 11.

More specifically, the terminal detection unit 13 is configured to detect the portable terminal 11 in a contact manner or a noncontact manner. By applying the technique of, for example, automatic ticket gates, shoplifting prevention systems, or the like, the terminal detection unit 13 can be achieved.

To the terminal detection unit 13, the information on the layout position of itself is given in advance. When the terminal detection unit 13 detects the portable terminal 11, the terminal detection unit 13 transmits the information on the layout position of the terminal detection unit 13 to the portable terminal 11. The portable terminal 11 distributes the information on the layout position of the terminal detection unit 13 associated with the ID of the portable terminal 11 itself to the other terminals 11. In other words, the other terminals 11 collect the ID and the information on the layout position from the portable terminal 11.

Alternatively, there may be another case where the portable terminal 11 transmits the ID of itself to the terminal detection unit 13 and the terminal detection unit 13 distributes the information on the layout position of itself associated with the ID of the portable terminal 11 to the other terminals 11.

Specifically, the communication environment management unit 41 (see FIG. 8) of each portable terminal 11 uses the terminal detection unit 13 to perform a process (referred to as a third terminal layout information acquisition process) for acquiring the terminal layout information, to thereby acquire the terminal layout information. The use of the terminal detection unit 13, however, is not limited to the above case.

The former case related to FIG. 15 corresponds to the already-described second terminal layout information acquisition process for acquiring the terminal layout information by using the communication between the self-terminal 11 and the other terminals 11.

Figure 16:
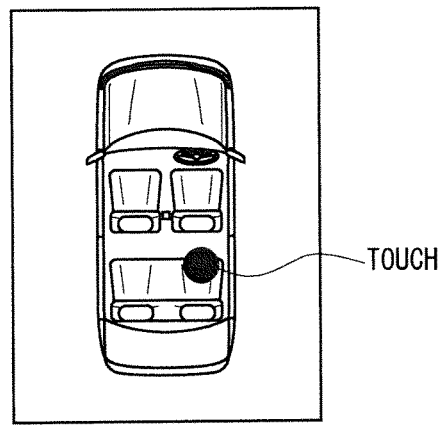
FIG. 16 is a view showing a second example of technique to specify a location of the portable information terminal in accordance with the fifth preferred embodiment.

Further, the user may input the position of the portable terminal 11. As shown in FIG. 16, for example, the user calls an image which is a plan view of the car as a position input operation screen and touches the seat where the user himself sits. With this operation, the portable terminal 11 distributes the information on the layout position of the seat on which the user touches, associated with the ID of the portable terminal 11 itself, to the other terminals 11. In other words, the other terminals 11 collect the ID and the information on the layout position from the portable terminal 11. Further, the position input operation screen may be called by the other terminal 11 which detects the portable terminal 11 or the system general control apparatus 12.

These methods can handle the case where the portable terminal 11 is located outside the car (see the sixth preferred embodiment described next).

The exemplary case related to FIG. 16 is classified to the already-described second terminal layout information acquisition process for acquiring the terminal layout information by using the communication between the self-terminal 11 and the other terminals 11.

Further, in a case where all the information terminals 11 including the portable terminal 11 each have the position information acquisition unit for acquiring the information on the current position of the self-terminal 11, each of the information terminals 11 can acquire the terminal layout information from the positional information of the other terminals 11 collected by communication and that of the self-terminal 11 (see the second terminal layout information acquisition process).

Furthermore, by using the already-existing technique such as the technique shown in Patent Document 1 or the like, the position of the portable terminal 11 may be specified.

Thus, in accordance with the fifth preferred embodiment, application of the information communication system 10 can be extended.

The Sixth Preferred Embodiment

In the fifth preferred embodiment, the case where the information communication system 10 includes the portable terminal 11 has been described. In a case of wireless communication type portable terminal 11, even when the portable terminal 11 is located outside the car, the portable terminal 11 can communicate with the information terminal 11 located inside the car. Therefore, the message 31 can be transmitted and received between the inside of the car and the outside thereof. The information terminal 11 located inside the car may be a portable-type one or an equipped-type one.

Outside the car, there are a lot of portable terminals 11. For this reason, it may be thought that the portable terminal 11 capable of communicating with the information terminal 11 located inside the car, in other words, the portable terminal 11 to be included in the information communication system 10 should be restricted.

The portable terminal 11 having an ID which is registered in the information communication system 10 in advance, for example, is entitled to take part in the information communication system 10 even when the portable terminal 11 is located outside the car. Specifically, the equipped-type information terminal 11 located inside the car or the system general control apparatus 12 manage and check pre-registration information.

Figure 17:
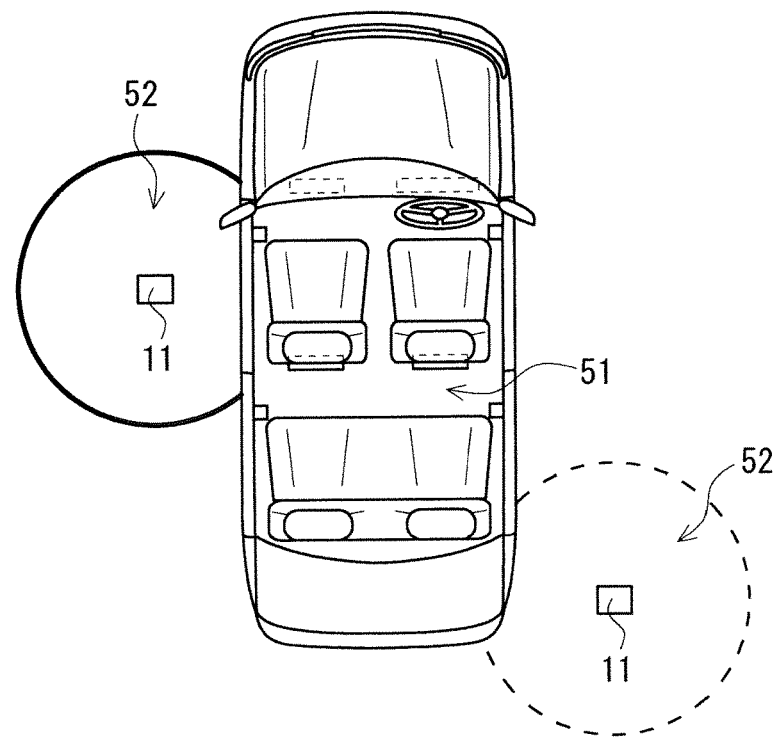
FIG. 17 is a view showing an information communication system in a case where a portable information terminal is present outside a car in accordance with a sixth preferred embodiment.

With reference to the conceptual diagram of FIG. 17, description will be made on this situation. In the case of FIG. 17, the inside of the car is a core area 51 of the information communication system 10. In other words, the information terminal 11 located inside the car is present in the core area 51.

Further, an area 52 in FIG. 17 represents a communication area of the portable terminal 11 located outside the car (more specifically, part of the communication area, which is located outside the car). The communication area 52 of the portable terminal 11 which is allowed to take part in the information communication system 10 is represented by a solid line, and the communication area 52 of the portable terminal 11 which is not allowed to take part in the information communication system 10 is represented by a broken line. Further, the respective positions of the portable terminals 11 and the number of portable terminals 11 are not limited to the case of FIG. 17.

In this case, the usable area of the information communication system 10 includes not only the core area 51 but also the communication area 52 of the portable terminal 11 which is allowed to take part in the information communication system 10. In short, it can be thought that such communication area 52 is regarded as identical to the core area 51. In other words, it can be thought that the core area 51 is extended up to such communication area 52. In consideration of this point, the communication area 52 which is regarded as identical to the core area 51 is referred to as an extended area 52.

Considering that the extended area 52 is not always present and the main usable area of the information communication system 10 is the core area 51, a situation in which the message 31 is transmitted and received only within the extended area 52 may be excluded. In other words, the usage condition for the information communication system 10 may be determined as that at least one of the transmission and the reception of the message is performed within the core area 51. In the destination selection process, by referring to the terminal layout information, for example, the position of the destination terminal 11 can be identified.

Further, some conditions may be imposed on formation of the extended area 52. For example, the extended area 52 is allowed only when the portable terminal 11 moves from the inside of the car to the outside thereof. For such a condition, the terminal detection unit 13 described in the case of FIG. 15 may be applied. For example, when the user goes into the car and goes out of the car, the user make the terminal detection unit 13 recognize the ID of the portable terminal 11. In this case, with the even-numberth recognition of ID, it is possible to detect that the portable terminal 11 goes out of the car.

Furthermore, some conditions of time may be imposed on the formation of the extended area 52. For example, the extended area 52 is allowed only in a predetermined time period from the time when the portable terminal 11 goes out of the car.

Thus, in accordance with the sixth preferred embodiment, application of the information communication system 10 can be extended.

The Seventh Preferred Embodiment

In the first to sixth preferred embodiments, as shown in FIG. 3, the case where one information output unit 23 and one information input unit 26 are provided in the information terminal 11 has been described. In contrast to this case, in the exemplary case of FIG. 18, two information output units 23*a* and 23*b* and two information input units 26*a* and 26*b* are provided. In this case, however, three or more information output units 23 and three or more information input units 26 may be provided.

Since the two display units 24*a* and 24*b* are provided in the exemplary case of FIG. 18, there are two display screens. The two display screens may be provided by physically different display apparatuses. Such a configuration is sometimes referred to as a dual display, a dual monitor, a multidisplay, a multimonitor, or the like.

Further, the two display screens may be provided by a single display apparatus. In this case, two display units 24*a* and 24*b* are implemented by a single display apparatus.

By separating the display screen of the single display apparatus into two in a right-and-left manner, for example, the left screen and the right screen are used as the respective display screens of the display units 24*a* and 24*b*. Such a configuration is sometimes referred to as a split screen system or the like.

Further, for example, the above-described single display apparatus may have a configuration in conformity to so-called split view. Specifically, in the split view, images which can be seen are different depending on the direction from which the display screen is seen, and the display screen for split view has a part providing an image which is seen from the left direction and another part providing an image which is seen from the right direction. Therefore, the two parts provide the respective display screens of the display units 24*a* and 24*b*.

The display screens of the display apparatus in the split screen system and in the split view system are arranged, for example, at the center of the dashboard, in other words, between the front of the driver seat and the front of the front passenger seat. In this case, provided are a screen for the driver seat (i.e., for the driver) and a screen for the front passenger seat. Further, for example, the split screen system or the split view system may be adopted for the portable terminal 11.

Similarly, two voice and sound output units 25*a* and 25*b* may be formed of different voice and sound output apparatuses or may be formed of a single voice and sound output apparatus.

Further, two information input units 26*a* and 26*b* may be formed of different touch panels or may be formed of a single touch panel.

In a case where the information terminal 11 has two information output units 23*a* and 23*b*, it can be also assumed that the message 31 displayed on one display unit 24*a* or 24*b* is transmitted to the other display unit 24*b* or 24*a*. In this case, the message 31 is transmitted and received between an information terminal 11*a* (see FIG. 18) including the information output unit 23*a* and the information input unit 26*a* and an information terminal 11*b* (see FIG. 18) including the information output unit 23*b* and the information input unit 26*b*. Further, in the exemplary case of FIG. 18, the information processing unit 21, the storage unit 22, and the external communication unit 27 are shared by the two information terminals 11*a* 11*b*.

The Eighth Preferred Embodiment

Figure 19:
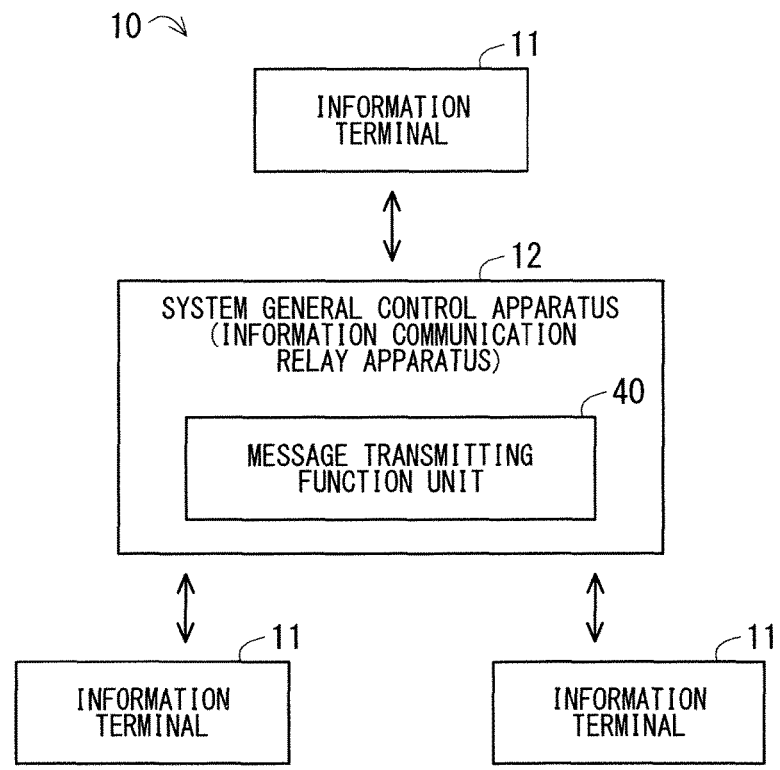
FIG. 19 is a block diagram showing a third example of constitution of the information communication system in accordance with an eighth preferred embodiment.

In the first to seventh preferred embodiments, the case where the message transmitting function unit 40 (see FIG. 8) is provided in the information terminal 11 has been described. In contrast to this case, as shown in FIG. 19, the message transmitting function unit 40 may be provided in the information processing unit of the system general control apparatus 12. Such a constitution can produce the above-described various effects.

The Ninth Preferred Embodiment

In the ninth preferred embodiment, description will be made on a process for converting the message 31. As the message conversion process, a translation process, a voice conversion process, and a text conversion process will be shown.

Figure 20:
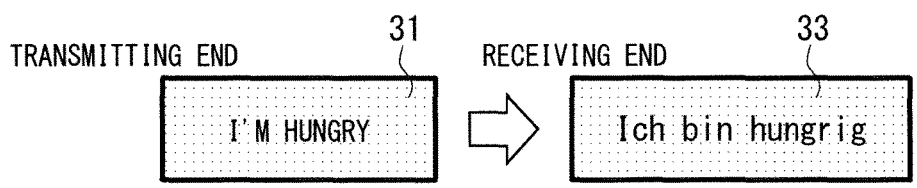
FIG. 20 is a view showing a translation process as a first example of message conversion in accordance with a ninth preferred embodiment.
Figure 21:
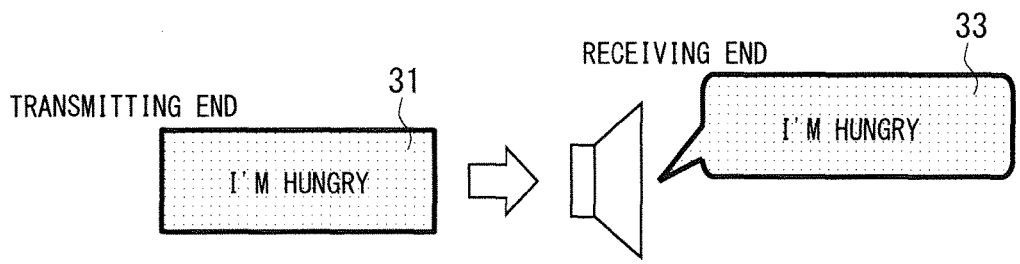
FIG. 21 is a view showing a voice conversion process as a second example of message conversion in accordance with the ninth preferred embodiment.
Figure 22:
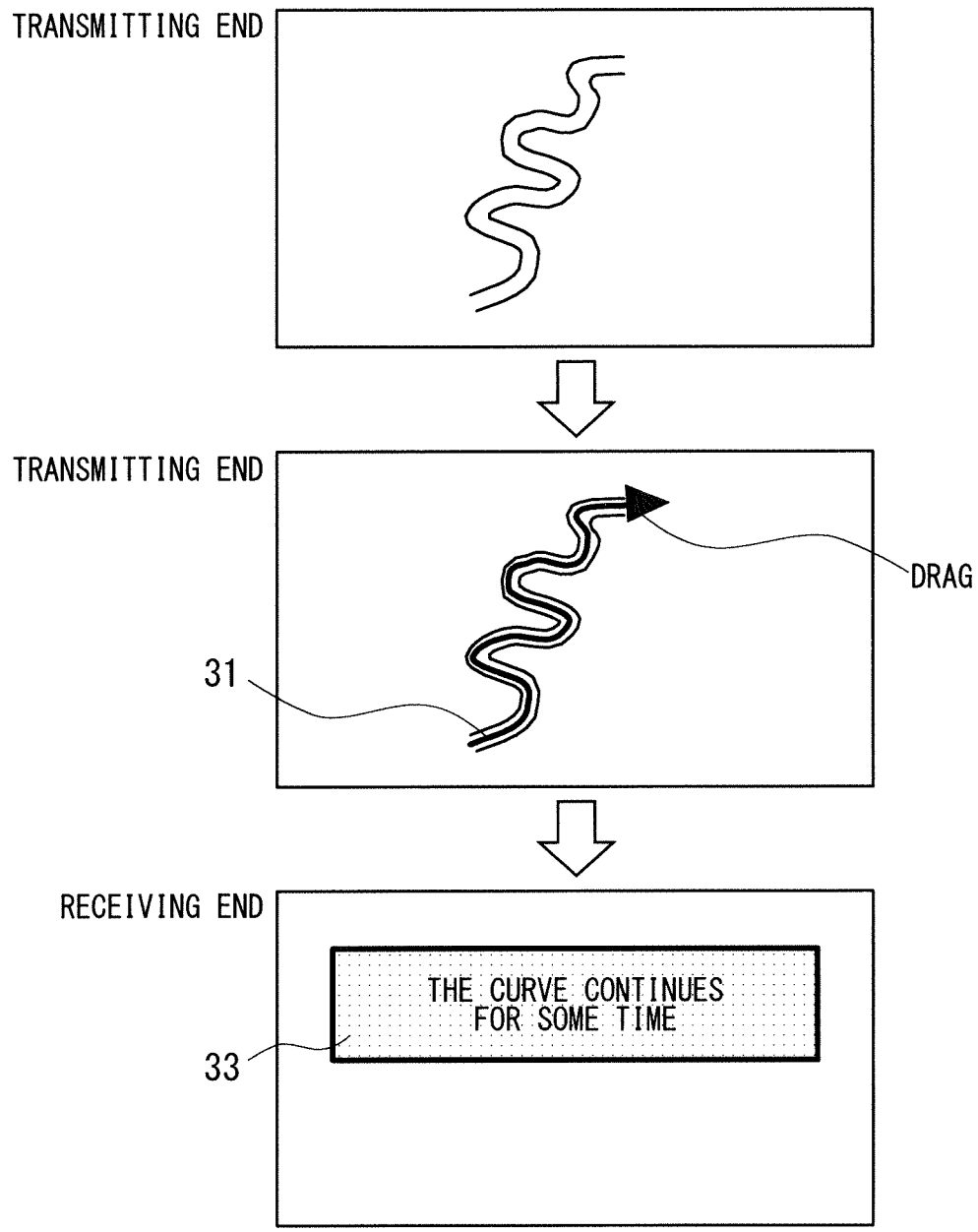
FIG. 22 is a view showing a text conversion process as a third example of message conversion in accordance with the ninth preferred embodiment.

In the translation process, the message 31 is converted into other language and outputted to the receiving-end terminal 11 (see FIG. 20). In the voice conversion process, the message 31 is outputted to the receiving-end terminal 11 as a voice message (see FIG. 21). In the text conversion process, the message 31 generated by the gesture operation of the user is outputted to the receiving-end terminal 11 as a corresponding text message (see FIG. 22). In FIGS. 20 to 22, reference numeral "33" represents a converted message.

Out of the translation process, the voice conversion process, and the text conversion process, two or more conversion processes may be combined. When the translation process is performed and then the voice conversion process is performed, for example, the message 31 is finally converted into a voice of other language. Further, the text message obtained by the text conversion process may be translated, or converted into a voice. Furthermore, the text message obtained by the text conversion process may be translated and then converted into a voice.

Though these three types of message conversion processes will be shown also hereinafter, the types of the message conversion processes are not limited to these exemplary processes. For example, conversion in display pattern, such as a blinking display or the like, may be adopted.

Figure 23:
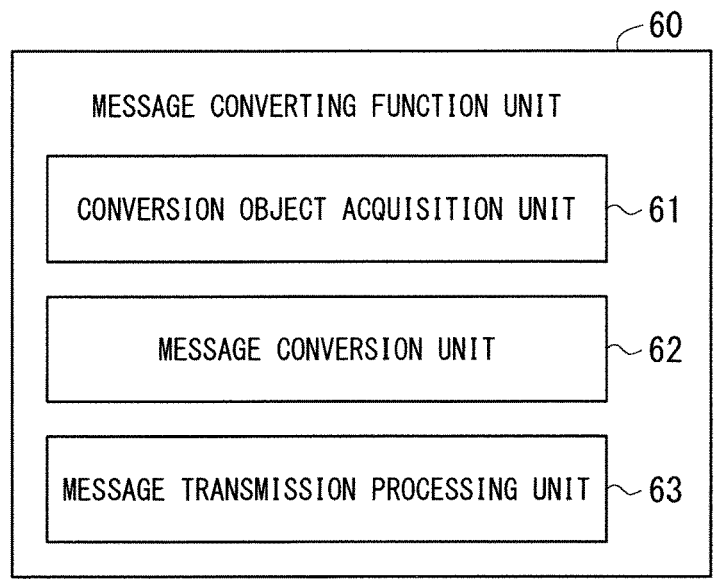
FIG. 23 is a view showing an exemplary constitution of a message converting function unit in accordance with the ninth preferred embodiment.
Figure 24:
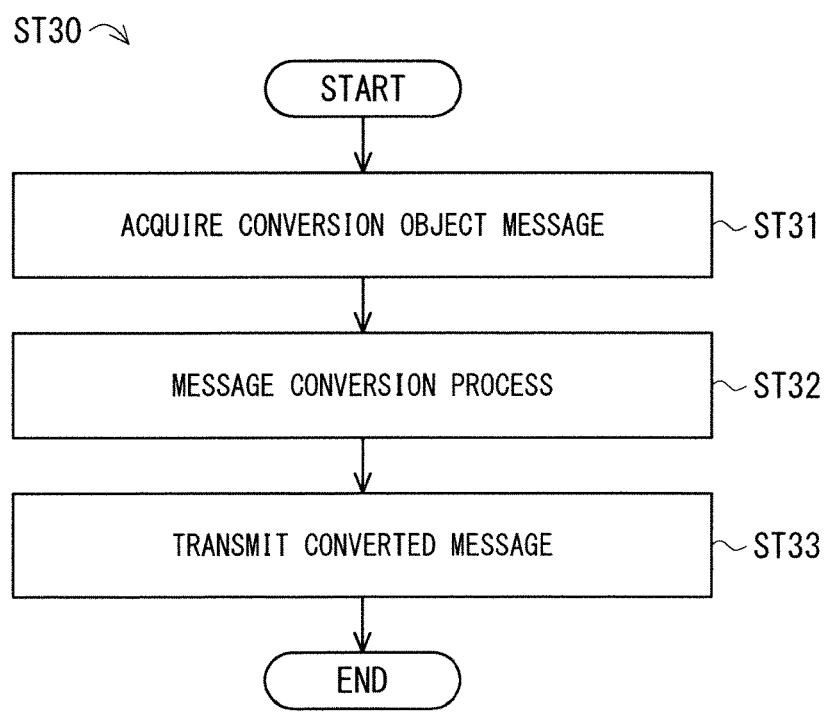
FIG. 24 is a flowchart showing an exemplary operation of the message converting function unit in accordance with the ninth preferred embodiment.

FIG. 23 is a view showing an exemplary constitution of a message converting function unit 60 for performing the message conversion process. FIG. 24 is a flowchart showing an exemplary operation of the message converting function unit 60.

Further, as described later, the message converting function unit 60 is provided in the information processing unit 21 of the information terminal 11 or the like. As described in the sixth preferred embodiment (see FIG. 17), since the message 31 is transmitted and received within the core area 51 or between the core area 51 and the extended area 52, the message converting function unit 60 is present in the core area 51 or the extended area 52.

In the exemplary case of FIG. 23, the message converting function unit 60 includes a conversion object acquisition unit 61, a message conversion unit 62, and a message transmission processing unit 63.

The conversion object acquisition unit 61 acquires a conversion object message (see step ST31 in the operation flow ST30 shown in FIG. 24). Herein, the conversion object message is the message 31 which is originally generated.

The message conversion unit 62 converts the conversion object message in accordance with the message conversion process which is determined in advance, to thereby acquire a converted message (see step ST32). In this case, the message conversion process which is determined in advance is at least one of the translation process, the voice conversion process, and the text conversion process with reference to the exemplary cases of FIGS. 20 to 22 and may be a combination of two or more of these conversion processes.

The translation process can be performed by using the already-existing technique. The message conversion unit 62 itself may have a translation function or may use a translation server provided outside the car (for example, on the internet) to perform the translation process. Specifically, the message conversion unit 62 uses the external communication unit (see the external communication unit 27 in FIG. 3) to access the translation server on the internet, transmits the conversion object message to the translation server, and receives the converted message from the translation server. Though the language to be obtained by translation is determined in advance, the user may determine the language to be obtained at the appropriate times.

The voice conversion process can be performed by using the already-existing technique. By using the text-to-speech technique, for example, it is possible to convert a text message (i.e., text data) into a voice message (i.e., voice and sound data).

The voice conversion process can be performed, for example, by storing a plurality of template text messages into the storage unit (see the storage unit 22 or the primary storage of the information processing unit 21 in FIG. 3) in advance and selecting a message corresponding to the gesture operation of the user out of the plurality of template text messages.

More specifically, in a case where the navigation function is used, it is assumed that the user traces (in other words, drags) a winding road, as shown in FIG. 22. The trajectory that the user traces becomes a conversion object message which is generated by the user. The message conversion unit 62 recognizes, for example, that the above trajectory which is the conversion object message is present on the winding road, that the trajectory is present ahead of the current position on the map, and the like. Then, from the recognition result, the message conversion unit 62 selects the message "the curve continues for some time" as the template text message corresponding to the user operation.

The text conversion process, however, is not limited to this exemplary case but may be performed by using one of other techniques.

The message conversion unit 62 transmits the converted message to the receiving-end terminal 11 (see step ST33).

In this case, the message conversion process may be performed between the time when the original message 31 is generated on the transmitting end and the time when the message 31 is provided to the user on the receiving end. For this reason, the message converting function unit 60 is provided in the transmitting-end terminal 11 or the receiving-end terminal 11. Further, in the exemplary constitution of FIG. 2, the message converting function unit 60 may be provided in the system general control apparatus 12 (in other words, in the information communication relay apparatus 12).

Figure 25:
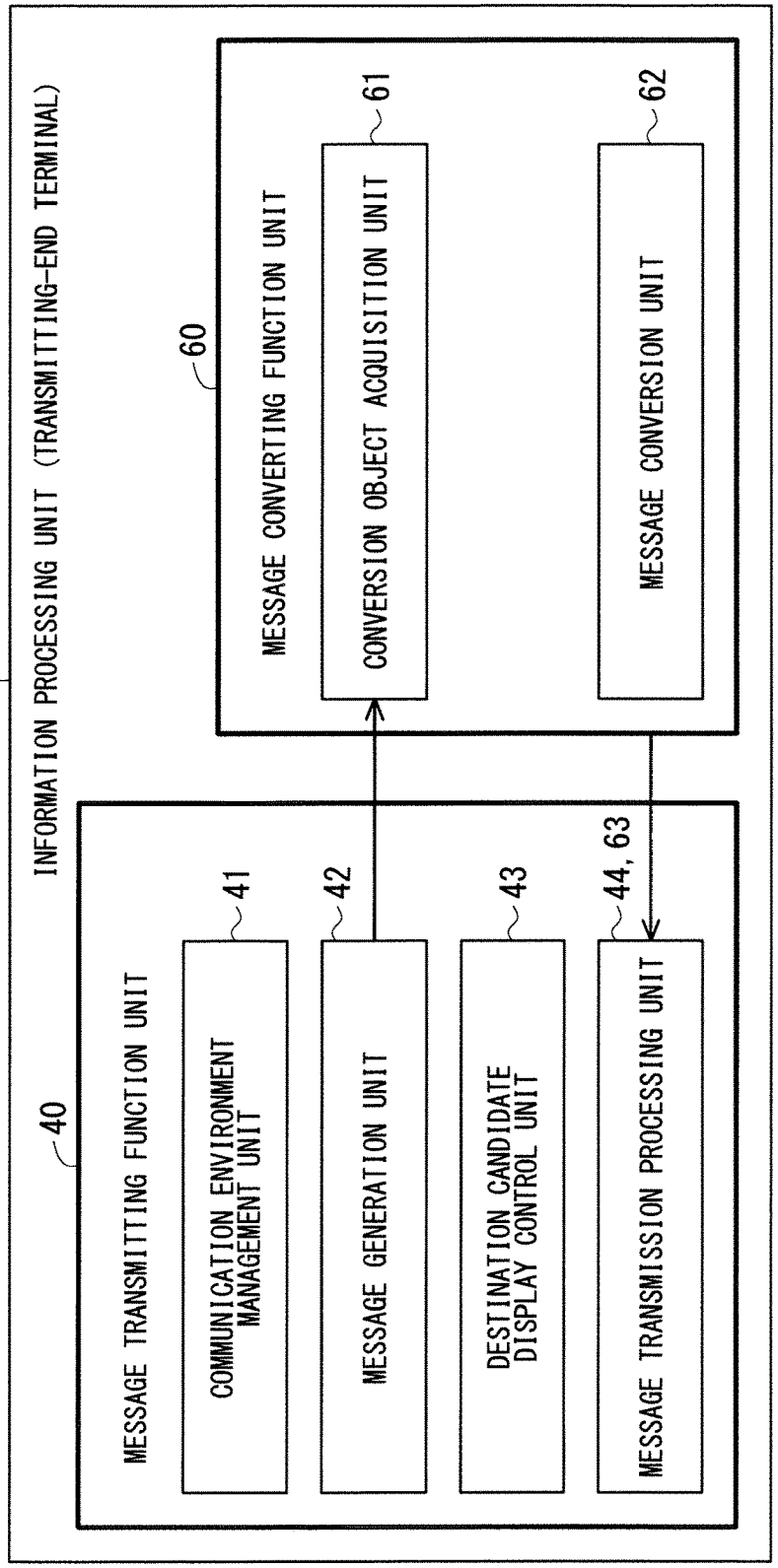
FIG. 25 is a block diagram showing an exemplary case where the message converting function unit is mounted on the transmitting-end terminal in accordance with the ninth preferred embodiment.

FIG. 25 is a block diagram showing an exemplary case where the message converting function unit 60 is mounted on the transmitting-end terminal 11. As shown in the exemplary case of FIG. 25, the conversion object acquisition unit 61 acquires the message 31 which is generated by the user, as the conversion object message, from the message generation unit 42.

Further, in the exemplary case of FIG. 25, the message transmission processing unit 63 in the message converting function unit 60 is implemented by the message transmission processing unit 44 in the message transmitting function unit 40. Specifically, the converted message is transmitted by delivering the converted message to the message transmission processing unit 44 in the message transmitting function unit 40.

Figure 26:
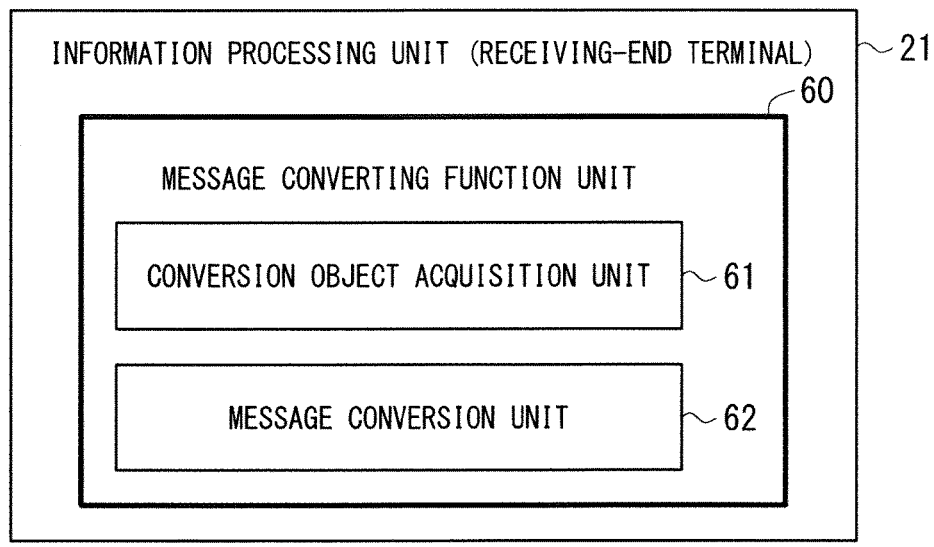
FIG. 26 is a block diagram showing an exemplary case where the message converting function unit is mounted on a receiving-end terminal in accordance with the ninth preferred embodiment.

FIG. 26 is a block diagram showing an exemplary case where the message converting function unit 60 is mounted on the receiving-end terminal 11. As shown in the exemplary case of FIG. 26, the conversion object acquisition unit 61 acquires the message 31 which is received from the other terminal 11, as the conversion object message.

Further, in the exemplary case of FIG. 26, the message transmission processing unit 63 is omitted in the receiving-end terminal 11. In a case where the receiving-end terminal 11 also serves as the transmitting-end terminal 11, however, the message transmission processing unit 63 is not omitted but does not perform any operation on the received message 31.

Figure 27:
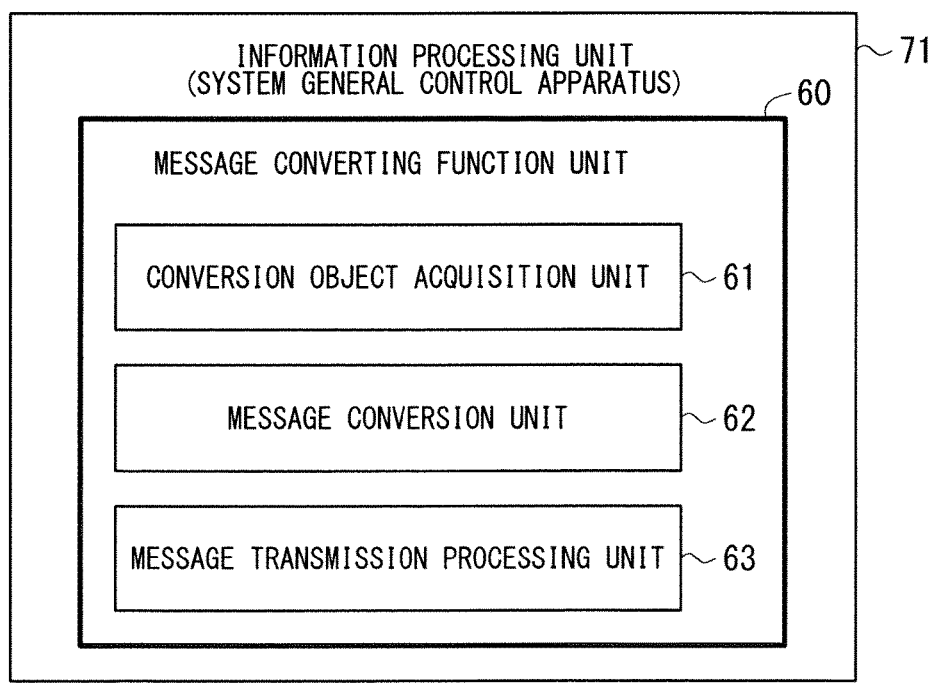
FIG. 27 is a block diagram showing an exemplary case where the message converting function unit is mounted on a system general control apparatus in accordance with the ninth preferred embodiment.

FIG. 27 is a block diagram showing an exemplary case where the message converting function unit 60 is mounted on an information processing unit 71 in the system general control apparatus 12 (in other words, in the information communication relay apparatus 12). The information processing unit 71 can be constituted in the same manner as the information processing unit 21 in the information terminal 11.

As shown in the exemplary case of FIG. 27, the conversion object acquisition unit 61 acquires the message 31 received from the transmitting-end terminal 11 as the conversion object message. Further, in the exemplary case of FIG. 27, the message transmission processing unit 63 transmits the converted message to the information terminal 11 which is determined as the destination in the received message 31.

The system general control apparatus 12 (in other words, the information communication relay apparatus 12) thereby acquires the message 31 transmitted from the transmitting-end terminal 11 as the conversion object message and transmits the converted message to the receiving-end terminal 11, to thereby perform the message conversion process in relaying the message 31.

In this case, the message converting function unit 60 may be provided in two or more out of the transmitting-end terminal 11, the receiving-end terminal 11, and the system general control apparatus 12 (in other words, the information communication relay apparatus 12).

In the above-described exemplary case, for example, the following uses are possible. First, the transmitting-end terminal 11 performs the text conversion process and transmits the text message (i.e., the converted message). Then, the receiving-end terminal 11 performs the translation process on the received text message as the conversion object message.

Alternatively, the system general control apparatus 12 performs the translation process on the received text message as the conversion object message and transmits the translated message (i.e., the converted message). Then, the receiving-end terminal 11 performs the voice conversion process on the translated message which is received, as the conversion object message.

Thus, between the time when the message 31 is generated on the transmitting end to the time when the message 31 is provided to the user on the receiving end, the conversion object message is converted in accordance with the message conversion process. Therefore, it is possible to provide various forms of people's communication.

It has already been described in the fourth preferred embodiment that the message 31 may be generated by any one of various hardwares or softwares. For this reason, for example, the guidance image (see FIG. 13) which is displayed at the appropriate times in a case where a navigation function is used, the notification image (see FIG. 14) which is displayed in relation to the condition of the car, and the like can be the conversion object message.

As to these images, for example, the above-described text conversion process can be applied. Specifically, the message 31 which is generated by any one of various hardwares or softwares, basically, is an image object which is prepared in advance, a combination of the image objects, or a variation of the image object. For this reason, by associating each image object with a template text message, the text conversion process can be performed.

It is more preferable that whether to perform the message conversion process can be selected. Such a selection may be set, for example, in a menu screen.

Figure 28:
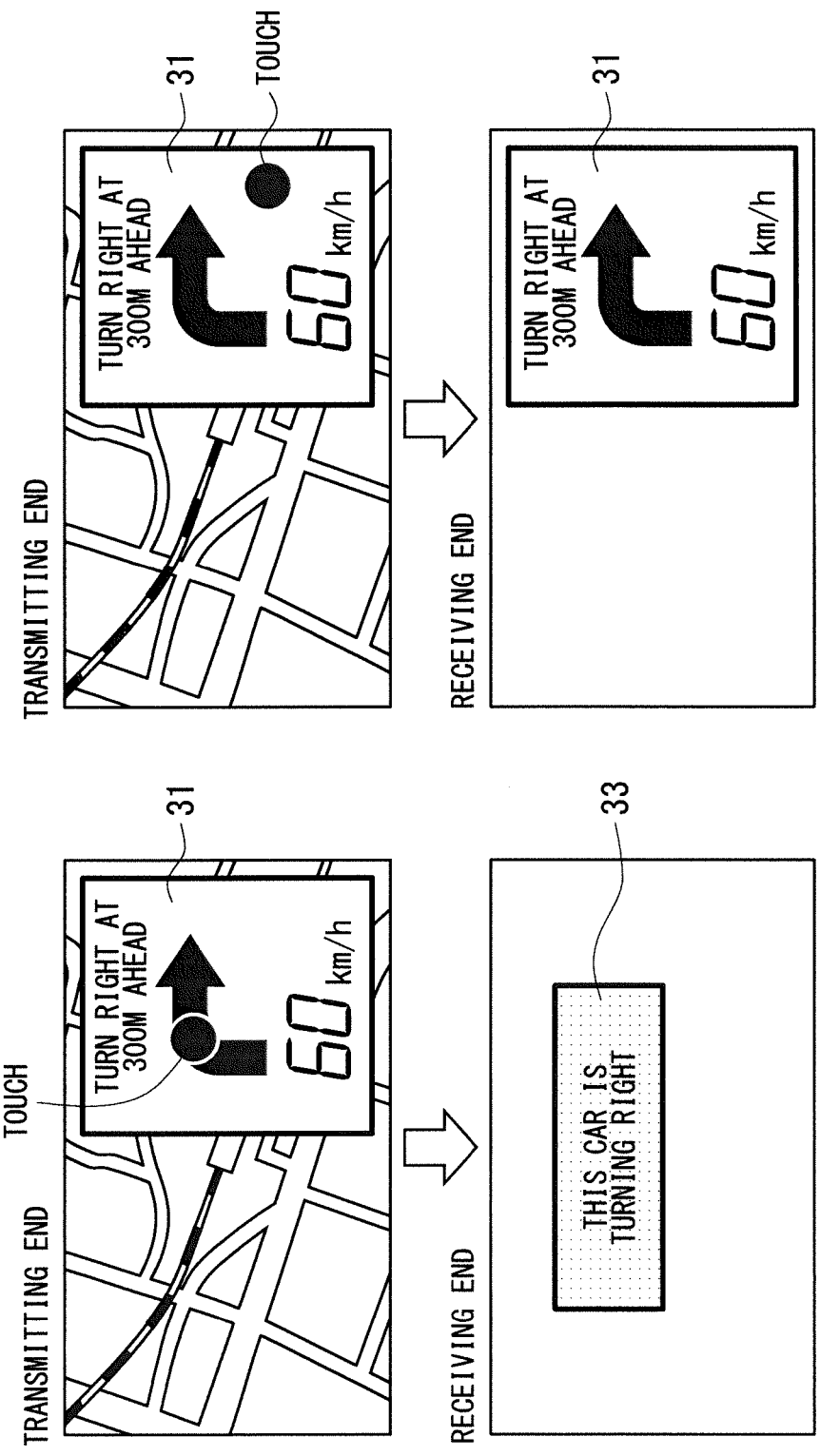
FIG. 28 is a view showing an exemplary selection on whether to perform a message conversion process in accordance with the ninth preferred embodiment.

Further, the user may select to perform the message conversion process when the user transmits the message 31. As shown in FIG. 28, for example, when a predetermined portion (the central portion, in the case of FIG. 28) in the message 31 is touched, the message conversion unit 62 performs the message conversion process. Instead, when another predetermined portion (the peripheral portion, in the case of FIG. 28) in the message 31 is touched, the message conversion unit 62 does not perform the message conversion process.

Alternatively, when a predetermined object (an arrow object indicating the right turn, in the case of FIG. 28) in the message 31 is touched, the message conversion unit 62 performs the message conversion process. Instead, when a background portion in the message 31 is touched, the message conversion unit 62 does not perform the message conversion process.

Further, the above-described touch operation in the case of FIG. 28 is, for example, a destination candidate call operation. Alternatively, the touch on the starting point of the first gesture operation or the like may be regarded as the above-described touch operation. More alternatively, other operations than these may be defined as the above-described touch operation.

The message conversion unit 62 may select whether to perform the message conversion process in accordance with the terminal attribute information of the receiving-end terminal 11. Further, the message conversion unit 62 may select the type of the message conversion process to be performed in accordance with the terminal attribute information of the receiving-end terminal 11. As shown in FIG. 29, for example, when the receiving-end terminal 11 is the driver's terminal, the voice conversion process is selected. In contrast to this case, a predetermined type of message conversion process is selected for other receiving-end terminals 11. Alternatively, for other receiving-end terminals 11, no message conversion process is performed.

Furthermore, the message conversion unit 62 may determine whether to perform the message conversion process and the type of the message conversion process to be performed in accordance with the vehicle speed. As shown in FIG. 30, for example, when the vehicle speed is not lower than a conversion related threshold value which is set in advance, the voice conversion process is selected. Instead, when the vehicle speed is lower than the above conversion related threshold value (including when the car is stopped), a predetermined type of message conversion process is selected. Alternatively, when the vehicle speed is lower than the above conversion related threshold value, no message conversion process is performed.

In the cases of FIGS. 29 and 30, under a predetermined condition, the user can know the content of the message 31 without watching the screen. By combining the cases of FIGS. 29 and 30, in particular, the driver can know the content of the message 31 without watching the screen during the period when the driver drives a car at the speed not lower than the above-described conversion related threshold value.

Whether to perform the message conversion process and the type of the message conversion process to be performed may be determined in accordance with the movement environment of the moving object. The movement environment includes road conditions, weather, and the like. Specifically, when the car shakes because of poor road conditions, the carsickness may be prevented or alleviated by outputting the message 31 by voice, not on the screen. When there is noise of the wind and rain, it may be preferable to display the message 31 on the screen, not perform any voice conversion process. Further, the information on the road conditions can be acquired from the map data, an information center, a vibration sensor mounted on the car, and the like, and the information on the weather can be acquired from a broadcast, an information center, and the like.

Whether to perform the message conversion process and the type of the message conversion process to be performed may be determined in accordance with a display condition of the receiving-end terminal 11. Specifically, when the receiving-end terminal 11 outputs a map image, an AV content, or the like, the receiving-end terminal 11 provides the message 31 by voice. Instead, when the receiving-end terminal 11 outputs a music content or the like and displays an operation image thereof, the receiving-end terminal 11 displays the message 31 superimposed on the operation image, not performing the voice conversion process. This prevents the message 31 from hiding the displayed content having higher importance.

Further, when the receiving-end terminal 11 is provided with the message converting function unit 60, the message converting function unit 60 can easily know the display condition of the receiving-end terminal 11. Instead, when the receiving-end terminal 11 is not provided with the message converting function unit 60, the receiving-end terminal 11 may notify the other terminals 11 of the display condition thereof.

Whether to perform the message conversion process and the type of the message conversion process to be performed may be determined in accordance with a combination of various conditions (not limited to the above conditions).

As described in the second preferred embodiment, the destination of the message (herein, the converted message) may be selected in accordance with the terminal attribute information of the receiving-end terminal 11. In this case, for example, the message transmission processing unit 63 determines whether to transmit the converted message to the driver's terminal 11 in accordance with the terminal attribute information of the receiving-end terminal 11. Further, for example, the message transmission processing unit 63 determines whether to transmit the converted message to the information terminal 11 of the user whose age is not higher than a predetermined age.

The case where the message converting function unit 60 is combined with the message transmitting function unit 40 has been described above. The message converting function unit 60, however, may be used without being combined with the message transmitting function unit 40. In such a case, when the conversion object acquisition unit 61 acquires the conversion object message, for example, the converted message can be transmitted without user's particular transmitting operation.

<Variation>

In the present invention, the preferred embodiments may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS 10 information communication system, 11 information terminal, 12 system general control apparatus (information communication relay apparatus), 13 terminal detection unit, 21 information processing unit (information processing apparatus), 31 message, 32 destination candidate icon, 33 converted message, 40 message transmitting function unit, 41 communication environment management unit, 43 destination candidate display control unit, 44 message transmission processing unit, 51 core area, 52 extended area, 60 message converting function unit, 61 conversion object acquisition unit, 62 message conversion unit, 62 message transmission processing unit, ST10, ST30 operation flows, ST11 to ST18 process steps.

The invention claimed is:

1. An information processing apparatus comprising:
a processor; and
a memory storing instructions which, when executed by the processor, perform the following
acquiring a message generated by a transmitting-end information terminal in a car to be transmitted to a receiving-end information terminal in said car as a conversion object message, said message being acquired during a period from a time when said message is generated by said transmitting-end information terminal to a time when said message is provided to a user by said receiving-end information terminal;
determining a type of a message conversion process on the basis of terminal attribute information of said receiving-end information terminal and converting said conversion object message in accordance with said message conversion process which is determined, to thereby acquire a converted message which is transmitted to said receiving-end information terminal,
wherein the information processing apparatus is mounted in said car,
one of the transmitting-end and receiving-end information terminals is positioned at a driver seat of said car, while the other of the transmitting-end and receiving-end information terminals is positioned at a passenger seat of said car, wherein said terminal attribute information indicates whether the receiving-end information terminal is positioned at said driver seat or said passenger seat, and
said message conversion process includes at least one of
a process to convert a message generated by performing a touch operation or a gesture operation on a display object on said transmitting-end information terminal into a corresponding text message; and
a voice conversion process to convert a text message into a voice message.

2. The information processing apparatus according to claim 1, wherein
said message conversion process includes a translation process.

3. The information processing apparatus according to claim 1, wherein
said message conversion process includes said process to convert said message which is generated by said touch or gesture operation on said display object into a corresponding text message, said process to convert depending on said terminal attribute information of said receiving-end information terminal.

4. The information processing apparatus according to claim 3, wherein
said message which is generated by said touch or gesture operation is a trajectory which is formed by tracing a map displayed on a screen, and
said text message has a content related to said trajectory on said map.

5. The information processing apparatus according to claim 1, wherein
said message conversion process includes said voice conversion process to convert a text message into a voice message when said terminal attribute information indicates that said receiving-end information terminal is positioned at said driver seat.

6. The information processing apparatus according to claim 1, wherein
the type of said message conversion process is determined on the basis of a condition of said car or a movement environment of said car.

7. The information processing apparatus according to claim 6, wherein
said conversion object message is a message related to said condition of said car or said movement environment of said car, and
said message related to said condition of said car or said movement environment of said car includes at least one of:
a guidance image which is displayed in a case where a navigation function is used; and
a notification image which is displayed in relation to said condition of said car.

8. The information processing apparatus according to claim 1, wherein
the type of said message conversion process is determined on the basis of a display condition of said receiving-end terminal.

9. The information processing apparatus according to claim 1, wherein the instructions, when executed, further perform the following:
transmitting said converted message to said receiving-end terminal.

10. The information processing apparatus according to claim 9, wherein
said receiving-end information terminal is selected in accordance with a type of a gesture operation performed on said transmitting-end information terminal to transmit said converted message.

11. The information processing apparatus according to claim 10, wherein the instructions, when executed, further performing the following:
causing said transmitting-end information terminal to display not less than one icon corresponding to not less than one receiving-end terminal, as a destination candidate icon, when a destination candidate call operation to cause said transmitting-end information terminal to display a destination candidate of said converted message is detected by said transmitting-end information terminal.

12. The information processing apparatus according to claim 9, wherein
a determination is made whether to transmit said converted message to said receiving-end terminal, in accordance with at least one of terminal attribute information of said receiving-end information terminal, a speed of said car, a movement environment of said car, and a display condition of said receiving-end information terminal.

13. The information processing apparatus according to claim 9, wherein the information processing apparatus is installed in said transmitting-end information terminal.

14. An information processing method comprising:
acquiring a message generated by a transmitting-end information terminal in a car to be transmitted to a receiving-end information terminal in said car as a conversion object message, said message being acquired during a period from a time when said message is generated by said transmitting-end information terminal to a time when said message is provided to a user by said receiving-end terminal;
determining a type of a message conversion process on the basis of terminal attribute information of said receiving-end information terminal; and
converting said conversion object message in accordance with said message conversion process which is determined, to thereby acquire a converted message which is transmitted to said receiving-end information terminal,
wherein the method is performed by an apparatus mounted in said car,
one of the transmitting-end and receiving-end information terminals is positioned at a driver seat of said car, while the other of the transmitting-end and receiving-end information terminals is positioned at a passenger seat of said car, wherein said terminal attribute information indicates whether the receiving-end information terminal is positioned at said driver seat or said passenger seat, and
said message conversion process includes at least one of
a process to convert a message generated by performing a touch operation or a gesture operation on a display object on said transmitting-end information terminal into a corresponding text message; and
a voice conversion process to convert a text message into a voice message.

15. The information processing method according to claim 14, further comprising:
transmitting said converted message to said receiving-end terminal.

* * * * *